(12) United States Patent
Takahata

(10) Patent No.: US 11,644,700 B2
(45) Date of Patent: May 9, 2023

(54) DISPLAY SYSTEM

(71) Applicant: Japan Display Inc., Tokyo (JP)

(72) Inventor: Masashi Takahata, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/888,711

(22) Filed: Aug. 16, 2022

(65) Prior Publication Data
US 2023/0054267 A1    Feb. 23, 2023

(30) Foreign Application Priority Data

Aug. 20, 2021 (JP) .............................. JP2021-135170

(51) Int. Cl.
*G02F 1/133* (2006.01)
*G02F 1/1335* (2006.01)
*G01K 3/00* (2006.01)
*G01K 7/16* (2006.01)

(52) U.S. Cl.
CPC ......... *G02F 1/13306* (2013.01); *G01K 3/005* (2013.01); *G01K 7/16* (2013.01); *G02F 1/133626* (2021.01); *G02F 2203/01* (2013.01); *G02F 2203/02* (2013.01)

(58) Field of Classification Search
CPC .................................................. G02F 1/13306
See application file for complete search history.

(56) References Cited

U.S. PATENT DOCUMENTS

| | | | |
|---|---|---|---|
| 9,734,776 B2 | 8/2017 | Uehara | |
| 9,753,283 B2 | 9/2017 | Nambara | |
| 2015/0098029 A1* | 4/2015 | Sato | G02F 1/133555 349/11 |
| 2016/0161742 A1* | 6/2016 | Yonemoto | H05B 47/105 349/11 |
| 2019/0331947 A1* | 10/2019 | Hagiwara | B60J 3/007 |

FOREIGN PATENT DOCUMENTS

| | | |
|---|---|---|
| JP | 2015-200720 A | 11/2015 |
| JP | 2015-210328 A | 11/2015 |

* cited by examiner

*Primary Examiner* — Edmond C Lau
(74) *Attorney, Agent, or Firm* — K&L Gates LLP

(57) ABSTRACT

A display system includes: a transmissive liquid crystal display panel; a light control panel having an active area with a light control area; a temperature detector provided in the liquid crystal display panel and having a detection area with a resistive element; a backlight; and a controller. A display area of the liquid crystal display panel, the active area, and the detection area overlap on an optical path of a projection light. The light control panel is disposed at such an angle that, when the light control area is in a light reflection state, the light control panel reflects external light to a position out of the optical path and different from a position of the liquid crystal display panel. The controller causes the light control area to reflect light when an output indicating that the resistive element has a predetermined temperature or higher is obtained.

6 Claims, 19 Drawing Sheets

FIG.9
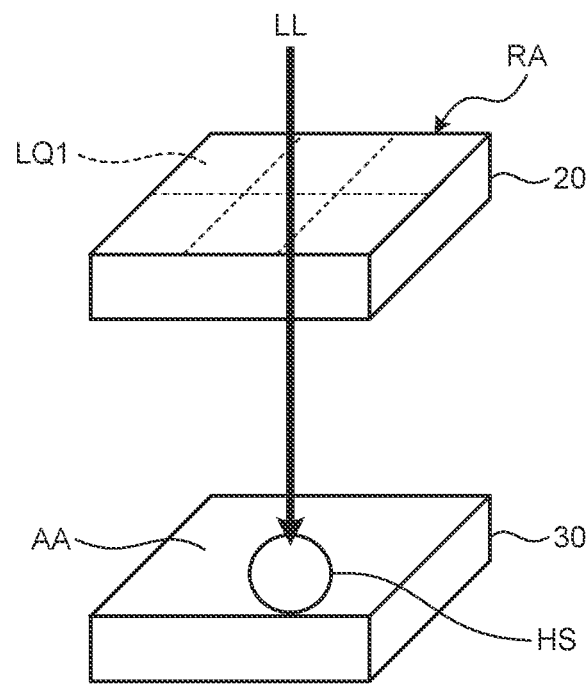
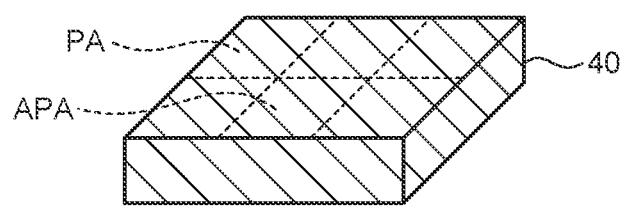
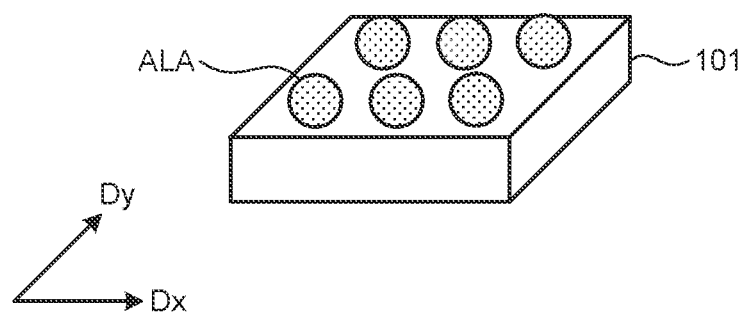

FIG.10
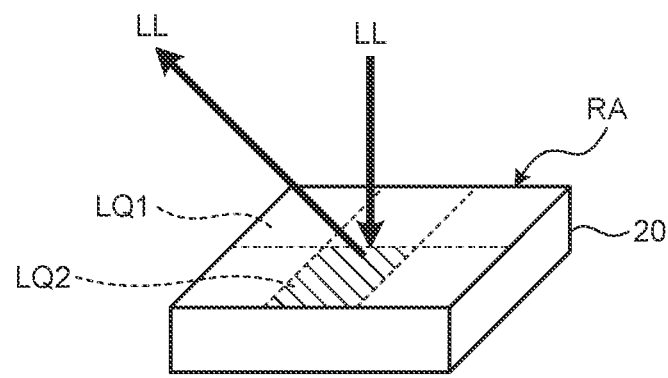
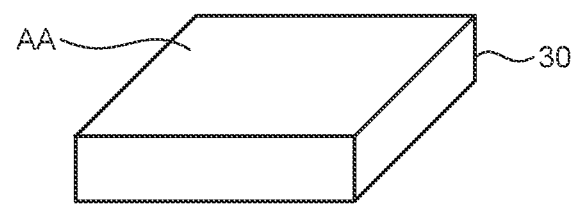
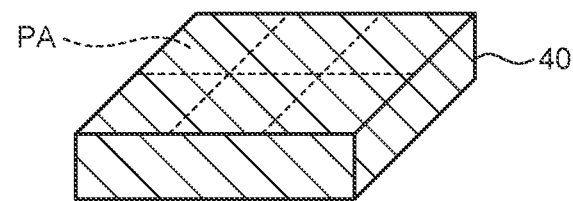
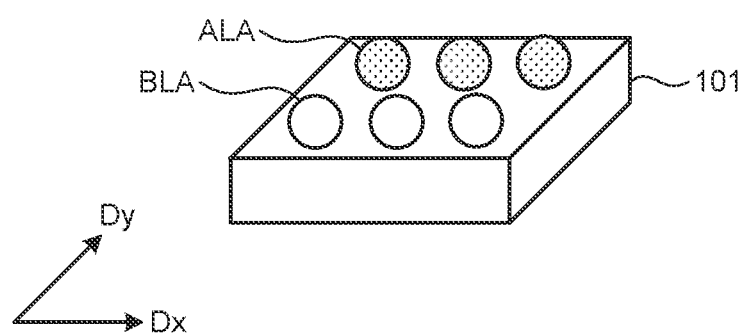

| | LIQUID CRYSTAL DISPLAY PANEL | BACKLIGHT | LIGHT CONTROL PANEL |
|---|---|---|---|
| INPUT IMAGE | 501, 502 | | |
| TEMPERATURE DETECTION RESULT | APA, PA | | |
| ALL REFLECTION MODE PERIOD | 501, 502 | BLA | FIRST REFLECTION MODE<br>LQ1, LQ2 |
| PROJECTION PERIOD (NORMAL DISPLAY MODE) | 501, 502 | FIRST LIGHT EMISSION MODE<br>ALA | SLEEP MODE<br>LQ1 |
| BLANKING PERIOD | 502 | ALA | LQ1 |

FIG.15

| | LIQUID CRYSTAL DISPLAY PANEL | BACKLIGHT | LIGHT CONTROL PANEL |
|---|---|---|---|
| INPUT IMAGE | 501, 502 | | |
| TEMPERATURE DETECTION RESULT | APA, PA | | |
| PARTIAL REFLECTION MODE PERIOD | 501, 502 | SECOND LIGHT EMISSION MODE — ALA, BLA | SECOND REFLECTION MODE — LQ2, LQ1 |
| PROJECTION PERIOD (NORMAL DISPLAY MODE) | 501, 502 | FIRST LIGHT EMISSION MODE — ALA | SLEEP MODE — LQ1 |
| BLANKING PERIOD | 502 | ALA | LQ1 |

DISPLAY SYSTEM

CROSS-REFERENCE TO RELATED APPLICATION

This application claims the benefit of priority from Japanese Patent Application No. 2021-135170 filed on Aug. 20, 2021, the entire contents of which are incorporated herein by reference.

BACKGROUND

1. Technical Field

What is disclosed herein relates to a display system.

2. Description of the Related Art

As described in Japanese Patent Application Laid-open Publication No. 2015-210328 (JP-A-2015-210328), what is called head-up display (HUD) devices that project an image onto a member having a light-transmitting property, such as glass, have been known.

With the technique in JP-A-2015-210328, sunlight may be incident on an HUD device through an optical system. When sunlight condensed by the optical system hits the HUD device, the place where the light hits the HUD device can become hot and adversely affect the HUD device. To address this, a temperature information acquisition method is known that determines a temperature of a structure provided with a temperature detection element based on a change in an electrical resistance value of an electrode provided as the temperature detection element as described in Japanese Patent Application Laid-open Publication No. 2015-200720.

With the structure based on a combination of conventional techniques, when the temperature detection element detects that the HUD device becomes hot, it has only been possible to perform a partial or full shut down of the HUD. It is thus difficult for the structure to restrain a further temperature rise due to continuous incident sunlight.

For the foregoing reasons, there is a need for a display system that can restrain a further temperature rise after achievement of a predetermined temperature.

SUMMARY

According to an aspect, a display system, includes: a transmissive liquid crystal display panel; a light control panel having an active area provided with a light control area that is switchable between a light reflection state and a light transmission state; a temperature detector having a temperature detection area provided with a temperature detection resistive element; a backlight that is configured to emit projection light onto the liquid crystal display panel; and a controller that is configured to control an operation of the light control panel based on an output of the temperature detector corresponding to a temperature of the temperature detection resistive element. The temperature detector is provided in the liquid crystal display panel. A display area of the liquid crystal display panel, the active area, and the temperature detection area overlap with one another on an optical path of the projection light. The projection light after passing through the display area and the active area is projected onto a projection target having a light-transmitting property. The light control panel is disposed at such an angle that, when the light control area is in the light reflection state, the light control panel reflects external light entering from the projection target side and reaching the light control area to a position that is out of the optical path of the projection light and different from a position of the liquid crystal display panel. The controller causes the light control area to reflect light when the output is obtained that indicates that the temperature of the temperature detection resistive element is equal to or higher than a predetermined temperature.

BRIEF DESCRIPTION OF THE DRAWINGS

FIG. 9 is a schematic view illustrating a temperature rise mechanism in the liquid crystal display panel;

FIG. 10 is a view illustrating a mechanism in which local reflection of sunlight by the light control panel restrains the temperature rise in the liquid crystal display panel;

FIG. 11 is a table schematically illustrating exemplary operations of the liquid crystal display panel, the backlight, and the light control panel in the normal display mode;

FIG. 13 is a table schematically illustrating exemplary operations of the liquid crystal display panel, the backlight, and the light control panel when an all reflection mode is applied;

FIG. 15 is a table schematically illustrating exemplary operations of the liquid crystal display panel, the backlight, and the light control panel when a partial reflection mode is applied;

DETAILED DESCRIPTION

Figure 1:
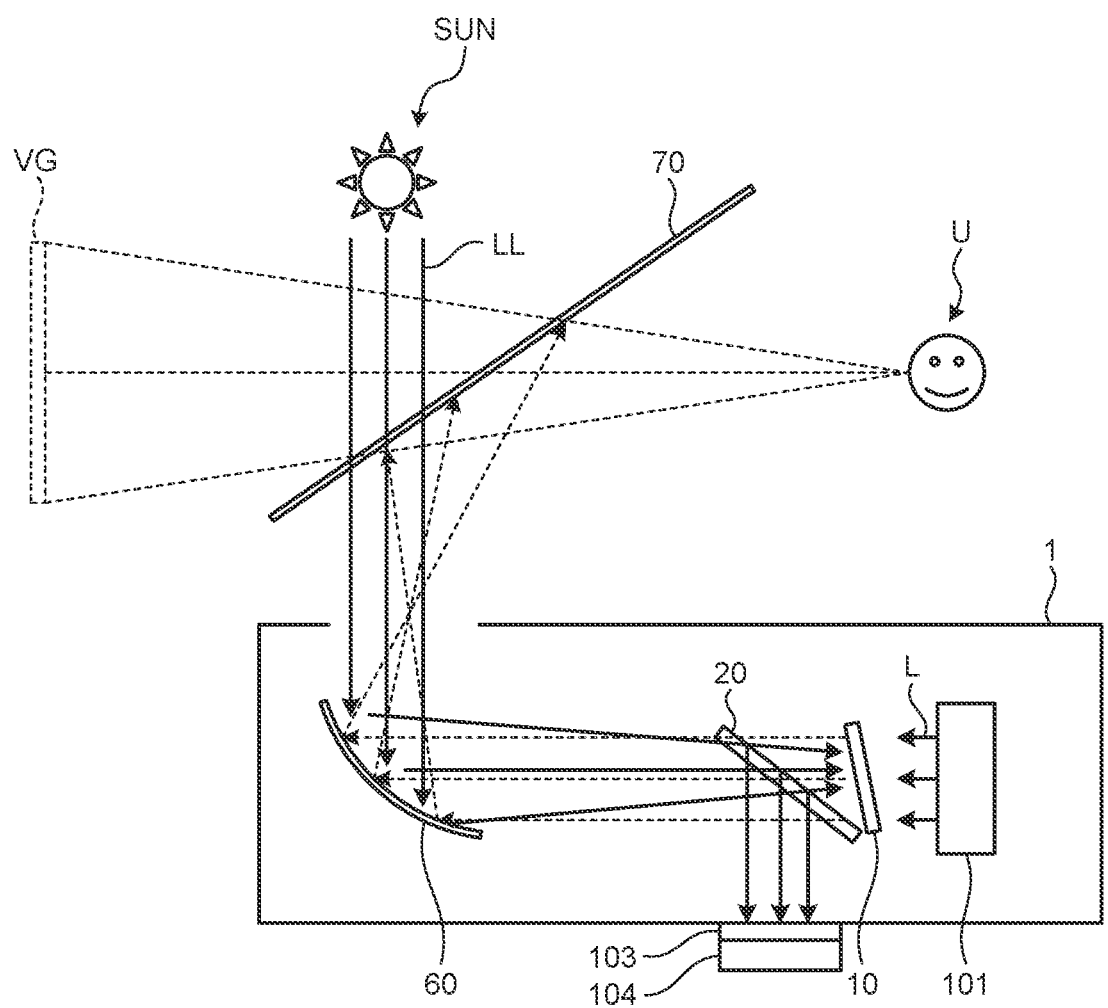
FIG. 1 is a schematic view illustrating an exemplary configuration of a display system according to an embodiment.

Hereinafter, an embodiment of the present disclosure will be described with reference to the drawings. What is disclosed herein is merely an example, and it is needless to say that appropriate modifications within the gist of the invention at which those skilled in the art can easily arrive are encompassed in the scope of the present disclosure. In the drawings, widths, thicknesses, shapes, and the like of the components can be schematically illustrated in comparison with actual modes for clearer explanation. They are, however, merely examples and do not limit interpretation of the present disclosure. In the present specification and the drawings, the same reference numerals denote components similar to those previously described with reference to the drawing that has already been referred to, and detail explanation thereof can be appropriately omitted.

FIG. 1 is a schematic view illustrating an exemplary configuration of a display system 1 according to an embodiment. The display system 1 includes a display panel 10, a backlight 101, a concave mirror 60, a light control panel 20, and a controller 110 (refer to FIGS. 6 and 7), which is described later.

Figure 8:
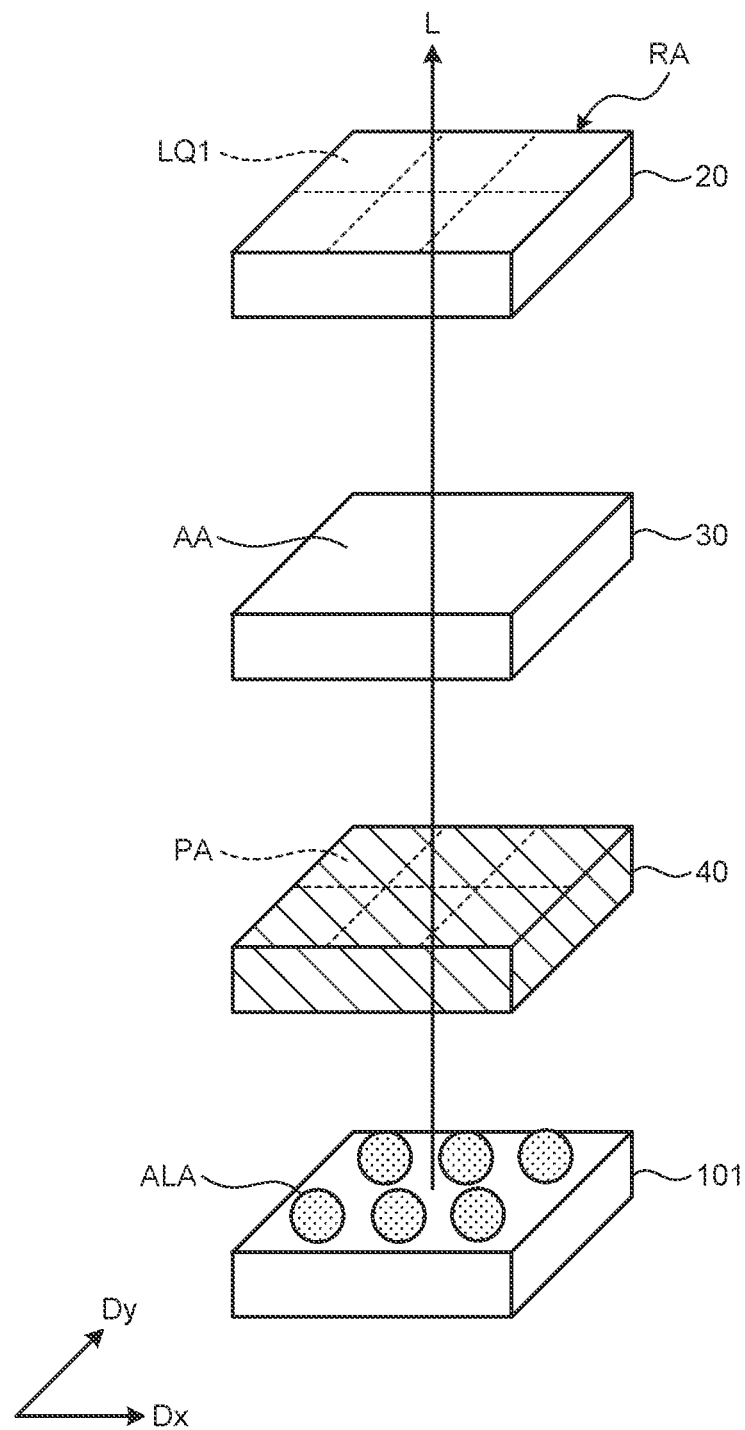
FIG. 8 is a schematic view illustrating the operations of the light control panel, a liquid crystal display panel, the temperature detector, and a backlight in a normal display mode.

The display panel 10 is what is called a liquid crystal display panel. The backlight 101 includes light source such as a light-emitting diodes (LEDs) and emits light from the rear surface side of the display panel 10. FIG. 8 and other figures, which are described later, illustrate a case where the light source is on as a lighting-on-state ALA, and a case where the light source is off as a lighting-off-state BLA.

The concave mirror 60 reflects projection light L that has been emitted from the backlight 101 and has passed through the display panel 10 and guides the projection light L to a projection target onto which the image output by the display system 1 is projected. In FIG. 1, a windshield 70 is illustrated as the projection target. The windshield 70 is, for example, a windshield of a four-wheeled vehicle or a windshield of an aircraft but is not limited thereto. It is sufficient that the projection target has a structure onto which the display system 1 can project an image. The projection target can be appropriately changed.

The projection light L output from the display system 1 is projected onto the windshield 70. FIG. 1 schematically illustrates the projection light L projected onto the windshield 70 with dashed arrows. A user U directing his/her line of sight to the projection light L projected onto the windshield 70, views a virtual image VG. In this way, the display system 1 in the embodiment functions as an HUD device that projects an image to be recognized as the virtual image VG onto the projection target such as the windshield 70.

In the example illustrated in FIG. 1, only one optical member, such as the concave mirror 60, is provided that reflects the projection light L on a traveling route of the projection light L between the display panel 10 and the windshield 70. Therefore, the image that is output by the display panel 10 is projected onto the windshield 70 in a mirror-reversed state. Thus, when a configuration faithful to FIG. 1 is employed, output of the display panel 10 is controlled in consideration of the mirror reversal. Examples of a method that does not cause the mirror reversal include a method in which another optical member is additionally provided that reflects the projection light L on the traveling route of the projection light L between the display panel 10 and the windshield 70. In the following explanation, it is assumed that no such mirror reversal occurs for the sake of clarity.

The projection target of the projection light L, such as the windshield 70, has a light-transmitting property. Thus, sunlight LL from the sun SUN may pass through the windshield 70 and irradiate the optical component, such as the concave mirror 60, of the display system 1. In FIG. 1, the sunlight LL that irradiates the concave mirror 60 is reflected by the concave mirror 60 and irradiates the display panel 10. The sunlight LL that irradiates the display panel 10 raises the temperature of the display panel 10. The temperature rise due to the sunlight LL may interfere with the good operation of the display panel 10.

The display system 1 in the embodiment is provided with the light control panel 20 to restrain the sunlight LL from reaching the display panel 10 when the temperature of the display panel 10 is equal to or higher than a predetermined temperature. As illustrated in FIG. 1, the light control panel 20 is provided between the concave mirror 60 and the display panel 10. The light control panel 20 functions to reflect the sunlight LL toward a heat absorber 103.

The heat absorber 103 exhibits a heat absorbing property. To take a specific example, the heat absorber 103 is a heat pipe. A part of the heat absorber 103 appears inside a housing of the display system 1. This part of the heat absorber 103 faces a reflection path side of the sunlight LL reflected by the light control panel 20 and is irradiated with the sunlight LL reflected by the light control panel 20. The other part excluding this part of the heat absorber 103 is exposed outside the housing of the display system 1. The heat absorber 103 is in contact with a radiator 104 outside the housing of the display system 1. The radiator 104 exhibits a heat dissipation property. To take a specific example, the radiator 104 is a heat sink.

The following explains the display panel 10 and the light control panel 20 with reference to FIGS. 2 to 5.

Figure 2:
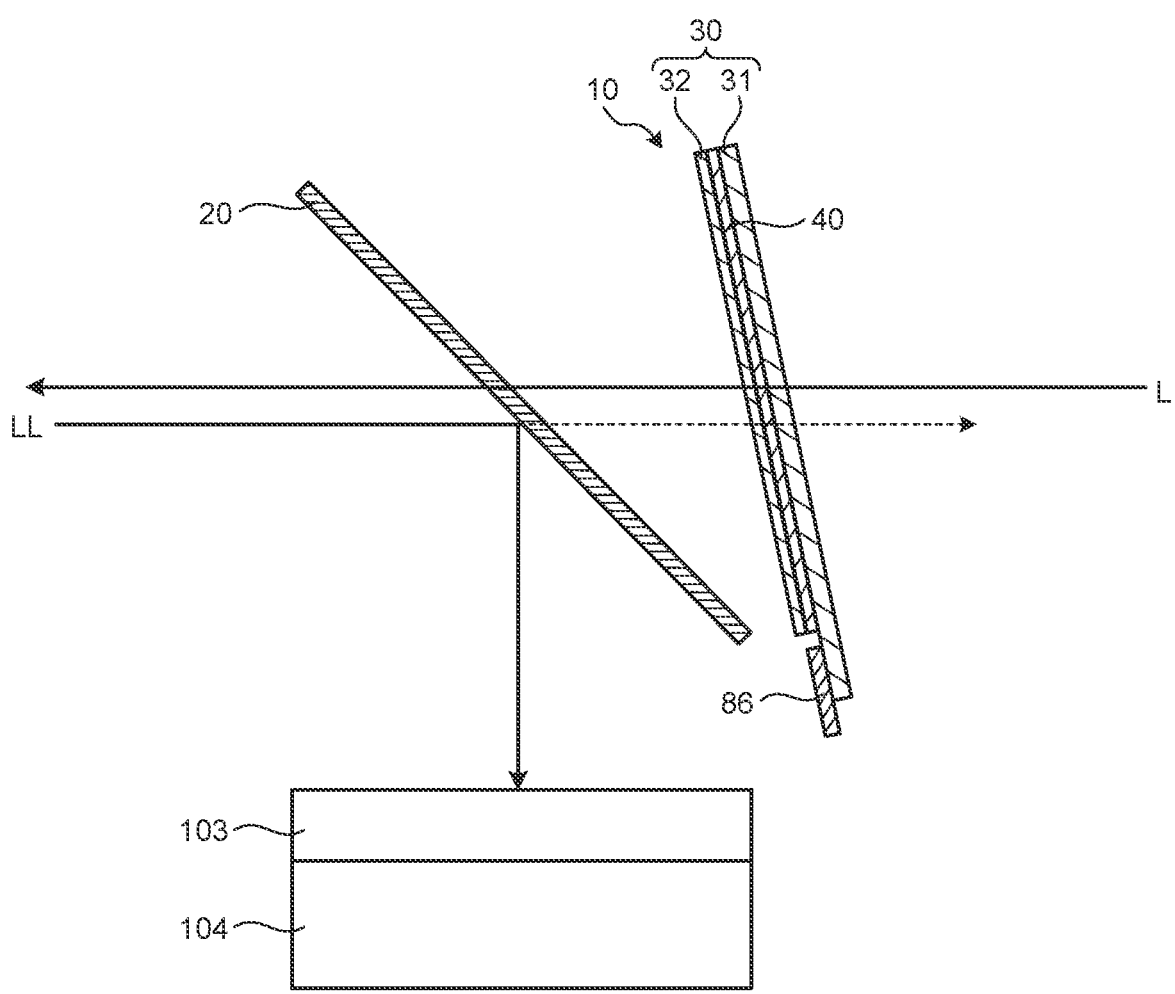
FIG. 2 is a schematic view illustrating an exemplary configuration of a display panel and a light control panel.

FIG. 2 is a schematic view illustrating an exemplary configuration of the display panel 10 and the light control panel 20. The display panel 10 includes a liquid crystal display panel 30 and a temperature detector 40. The liquid crystal display panel 30 is a transmissive liquid crystal display panel. The liquid crystal display panel 30 includes a first substrate 31 and a second substrate 32. The first substrate 31 is a layered substrate in which thin film transistors (TFTs) that individually drive active matrix pixels provided in the liquid crystal display panel 30, wiring lines coupled to the TFTs, and the like are mounted on a light-transmitting substrate. In a display area AA (refer to FIGS. 8 to 10) in which a plurality of such pixels are arranged, the liquid crystal display panel 30 outputs an image. The second substrate 32 is a light-transmitting substrate, and liquid crystal is sealed between the first substrate 31 and the second substrate 32. The light-transmitting substrates of the first and the second substrates 31 and 32 are glass substrates, for example, but may be substrates that are made of another material and have a light-transmitting property.

The liquid crystal display panel 30 is further provided with polarizers, which are not illustrated. The polarizers are provided so that a degree of light passing through the liquid crystal display panel 30 changes depending on the orientation of the liquid crystal. The orientation is changed by driving the pixels of the liquid crystal display panel 30. Specifically, the polarizers are provided, for example, on the backlight 101 side of the first substrate 31 and on the concave mirror 60 side of the second substrate 32. The polarization direction of light transmitted by the polarizer provided on the backlight 101 side of the first substrate 31 is orthogonal to the polarization direction of light transmitted by the polarizer provided on the concave mirror 60 side of the second substrate 32.

The temperature detector 40 can obtain information on the temperature of the liquid crystal display panel 30. An exemplary structure of the temperature detector 40 is explained with reference to FIG. 3.

Figure 3:
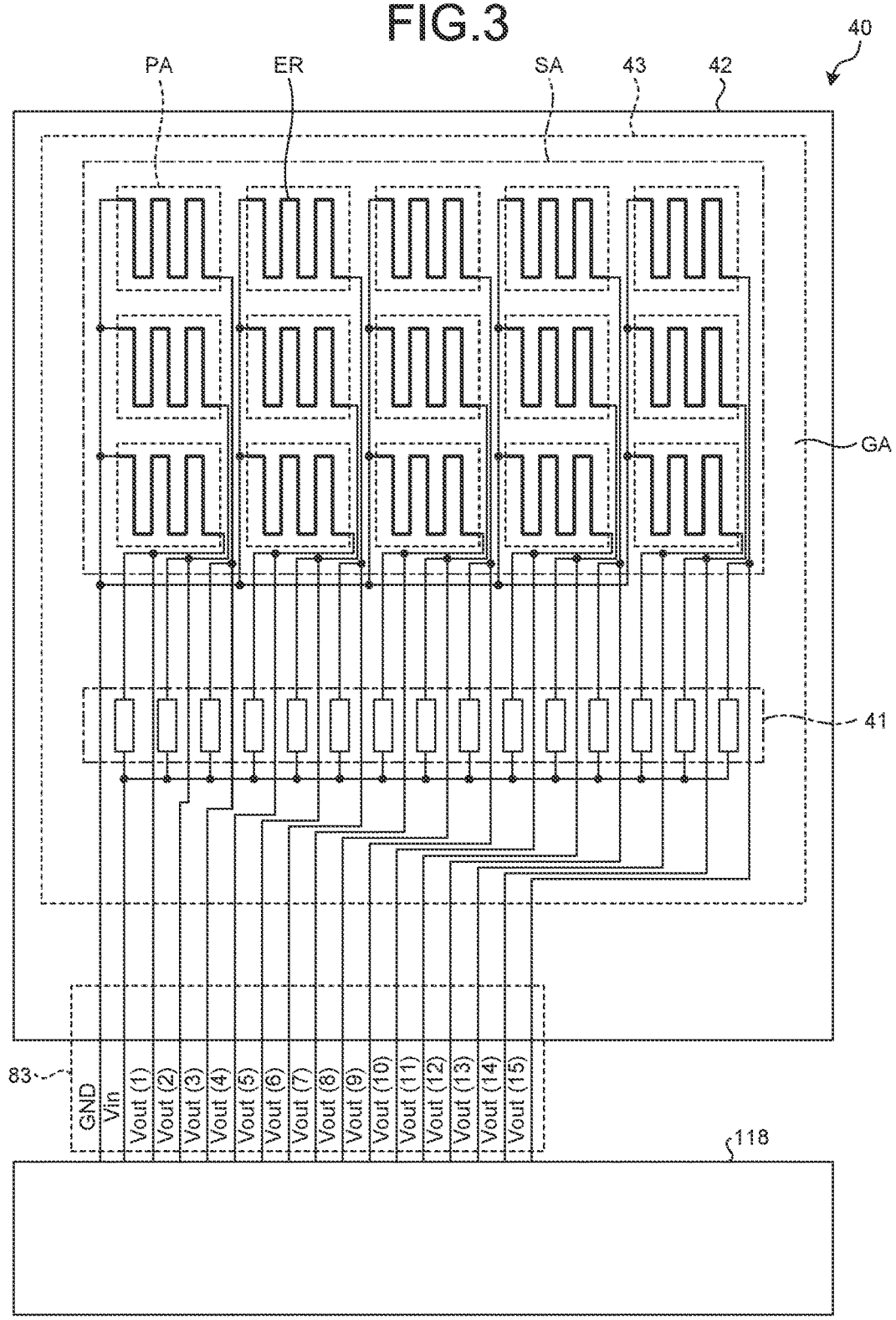
FIG. 3 is a schematic view illustrating a main structure of a temperature detector and a controller according to the embodiment.

FIG. 3 is a schematic view illustrating a main structure of the temperature detector 40 and the controller according to a first embodiment. As illustrated in FIG. 3, the temperature detector 40 has a sensor base member 42 and a sensor 43. Hereinafter, a direction perpendicular to the plate surface of the temperature detector 40 illustrated in FIG. 2 is referred to as a third direction Dz. One of two directions along the plane perpendicular to the third direction Dz is referred to as a first direction Dx, and the other is referred to as a second direction Dy.

The sensor base member 42 has a temperature detection area SA and a peripheral area GA. The temperature detection area SA includes a plurality of partial temperature detection areas PA. The partial temperature detection areas PA are each provided with a plurality of temperature detection resistive elements ER (hereinafter, referred to as temperature detection resistors ER, in some cases) included in the sensor 43. The third direction Dz is also the normal direction of the sensor base member 42.

The temperature detection resistor ER is an electrical resistor made of an alloy, a compound containing metal (metallic compound), or metal as a raw material. The temperature detection resistor ER may be a layered body consisting of multiple types of raw materials that correspond to at least one of the categories of metal, alloys, and metal compounds. An expression of "the alloy and the like" in the explanation of the first embodiment indicates the raw material that can be employed as the composition of the temperature detection resistor ER. In the example illustrated in FIG. 3, the temperature detection resistor ER has such a form that a plurality of L-shaped wiring lines having long sides along the second direction Dy are coupled with one another in the first direction Dx. In this form, the L-shaped wiring lines are coupled such that the short sides of the two L-shaped wiring lines adjacent in the first direction Dx are arranged in the second direction Dy in a staggered manner to form the temperature detection resistor ER.

The peripheral area GA is between the outer circumference of the temperature detection area SA and the edges of the sensor base member 42, and no temperature detection resistors ER are provided in the peripheral area GA. A plurality of reference resistive elements 41 (hereinafter, referred to as reference resistors ER, in some cases) are provided in the peripheral area GA. The temperature sensor is composed of the temperature detection resistors ER provided in the partial temperature detection areas PA and the reference resistors 41 provided in the peripheral area GA.

The temperature detection resistors ER and the reference resistors 41 are coupled to wiring lines in a wiring part 83. The wiring lines included in the wiring part 83 are coupled to a temperature sensor interface (I/F) 118 of the controller 110, which is described later. The wiring lines provided in the wiring part 83 include a ground potential line GND, a signal input line Vin (hereinafter, referred to as an input line Vin), and signal output lines Vout (hereinafter, referred to as output lines Vout). The expression of "the output line Vout" described hereinafter includes a plurality of output lines, such as output lines Vout (1), Vout (2), . . . , Vout (15), which are provided corresponding to the number of temperature detection resistors ER. The ground potential line GND illustrated in FIG. 3 is coupled to a first end of each of the temperature detection resistors ER. The ground potential line GND provides ground potential to the temperature detection resistors ER. The input line Vin is coupled to a first end of each of the reference resistors 41. The output lines Vout are coupled to second ends of the temperature detection resistors ER and second ends of the reference resistors 41.

A drive signal of the temperature detector 40 is input from the input line Vin. The drive signal is output to the output line Vout via the temperature detector 40. An intensity of the signal output from the output line Vout depends on the temperature of the temperature detection resistor ER coupled to the output line Vout. In other words, the temperature of the partial temperature detection area PA in which the temperature detection resistor ER is provided can be detected based on the signal output from the output line Vout.

The number of electrical resistive elements provided as the reference resistors 41 and the number of output lines Vout correspond to the number of temperature detection resistors ER. The electrical resistive elements are coupled in parallel to the single input line Vin. The example illustrated in FIG. 3, the number of temperature detection resistors ER is 15. The signals corresponding to the temperature of the 15 temperature detection resistors ER are respectively output from the output lines Vout (1), Vout (2), . . . , Vout (15). The number of temperature detection resistors ER is not limited to 15 and can be appropriately changed. The specific form of the temperature detector 40, such as the wiring shape of the temperature detection resistor ER, is not limited to this example and can be appropriately changed.

The temperature detector 40 illustrated in FIG. 2 is a circuit layer stacked on the first substrate 31 side of the second substrate 32. The specific mounting method of the temperature detector 40 is not limited to this example. The temperature detector 40 may be mounted on a separate light-transmitting substrate. In this case, the light-transmitting substrate is provided on the liquid crystal display panel 30 so as to overlap therewith. In this case, the light-transmitting substrate may be provided on either the backlight 101 side or the concave mirror 60 side but is more preferably provided on the concave mirror 60 side.

The light control panel 20 is a liquid crystal panel that is switchable between a light transmission state and a light reflection state. The projection light L passes through the light control panel 20 and reaches the concave mirror 60 (refer to FIG. 1), resulting in the projection light L being projected onto the windshield 70. The sunlight LL is reflected by the light control panel 20, resulting in the heat absorber 103 being irradiated with the sunlight LL.

Figure 4:
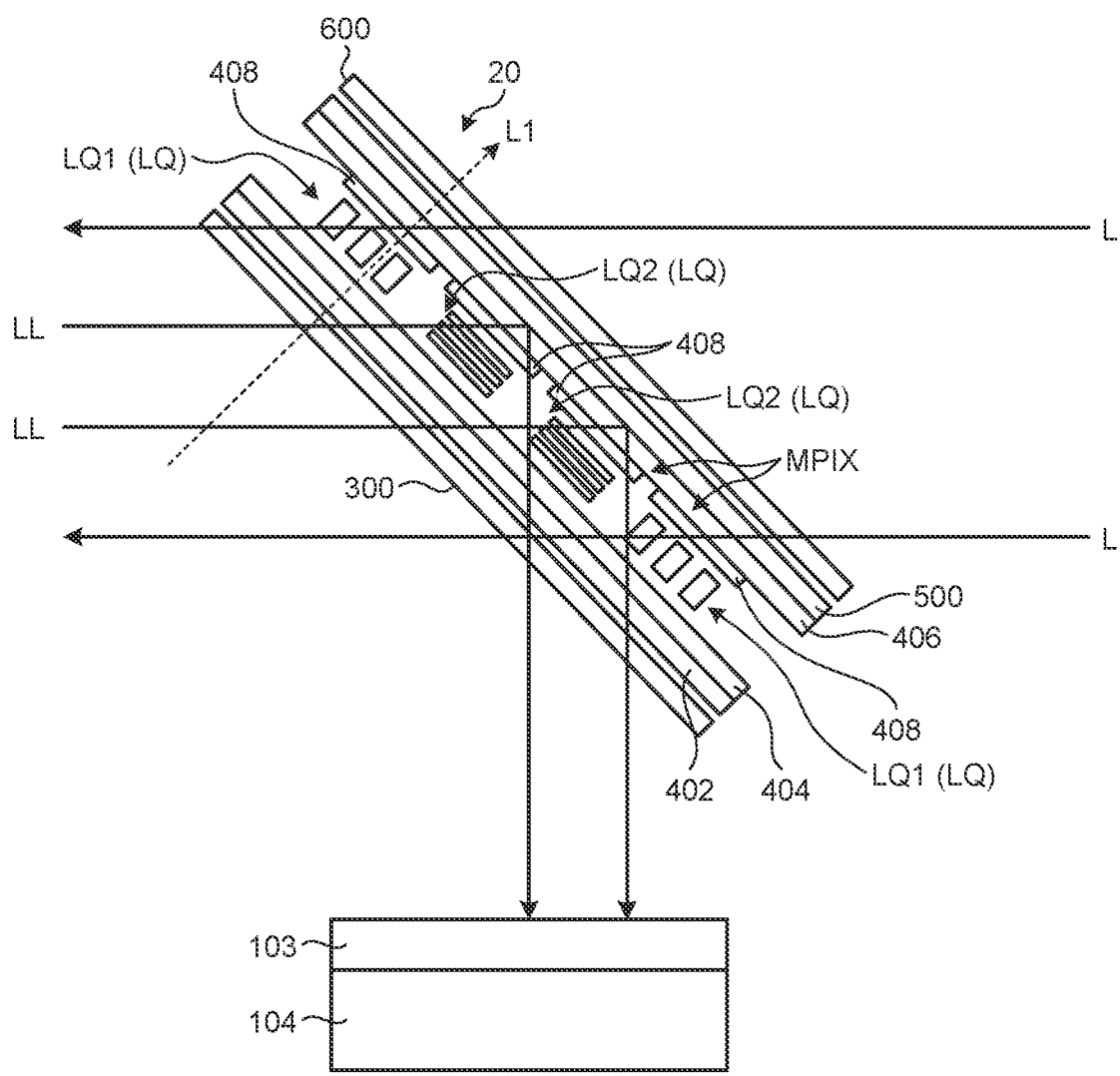
FIG. 4 is a schematic view illustrating how the light control panel changes light transmittance and light reflectance on a light control area basis.

FIG. 4 is a schematic diagram illustrating how the light control panel 20 changes light transmittance and light reflectance on a light control area MPIX basis. The light control panel 20 includes a first substrate 402 and a second substrate 406, for example. The first substrate 402 and the second substrate 406 face each other. The first substrate 402 and the second substrate 406 are substrates having a light-transmitting property, such as glass substrates, for example. First electrodes 408 are provided in a matrix having a row-column configuration on one surface side of the second substrate 406. The first electrodes 408 are respectively provided in the light control areas MPIX included in the light control panel 20.

The second substrate 406 is a layered substrate in which TFTs that drive the light control areas MPIX individually, wiring lines coupled to the TFTs, and the like are provided, which are not illustrated.

A second electrode 404 is provided on a surface of the first substrate 402 facing the first electrodes 408. The first electrodes 408 are each coupled to a source or a drain of one of the TFTs provided in the light control panel 20 so that potential of each of the first electrodes 408 is individually controllable. The first electrodes 408 in the light control areas MPIX are each individually driven by an active matrix system. A liquid crystal LQ is enclosed between the first electrodes 408 and the second electrode 404. Reference potential is applied to the second electrode 404. The state of the liquid crystal LQ in each of the light control areas MPIX is controlled in accordance with a difference between the potential of the corresponding first electrode 408 and the reference potential of the second electrode 404.

A first polarizer 300 is provided on a surface of the light control panel 20 on the concave mirror 60 side. The first polarizer 300 transmits light with a first linear polarization component and absorbs light of the other phases. A second polarizer 600 is provided on a surface of the light control panel 20 on the display panel 10 side. The second polarizer 600 transmits light with a second linear polarization component and absorbs light of the other phases. The projection light L after passing through the display panel 10 corresponds to light with the second linear polarization component. The polarization direction of light with the first linear polarization component is orthogonal to the polarization direction of light with the second linear polarization component.

As illustrated in FIG. 4, a reflective polarizer 500 is disposed between the second substrate 406 and the second polarizer 600. The reflective polarizer 500 is a plate-shaped or film-shaped member provided such that its transmittance and reflectance vary depending on the phase of light. Specifically, the reflective polarizer 500 transmits light with the second linear polarization component. On the other hand, the reflective polarizer 500 reflects light with the first linear polarization component.

The state of the liquid crystal LQ in the light control area MPIX can be switched between a first state LQ1 and a second state LQ2 according to the potential difference between the first electrode 408 and the second electrode 404. When the state of the liquid crystal LQ is the first state LQ1, the polarization direction of light is changed by 90° in the light control area MPIX. As a result, when the state of the liquid crystal LQ is the first state LQ1, the polarization direction of the projection light L incident on the light control panel 20 from the display panel 10 side changes from the second linear polarization component to the first linear polarization component in the light control area MPIX, passes through the first polarizer 300, and is emitted to the concave mirror 60. The sunlight LL incident on the light control panel 20 after being reflected by the concave mirror 60 passes through the first polarizer 300. The sunlight LL after passing through the first polarizer 300 corresponds to light with the first polarization component. The polarization direction of the sunlight LL after passing through the first polarizer 300 changes from the first linear polarization component to the second linear polarizing component in the light control area MPIX when the state of the liquid crystal LQ is the first state LQ1. Thereafter, the sunlight LL passes through the reflective polarizer 500 and the second polarizer 600. In other words, when the liquid crystal in the light control area MPIX is the first state, sunlight traveling from the concave mirror 60 to the display panel 10 is limited to have the second linear polarization component by passing through the first polarizer 300 and the light control panel 20. Sunlight with the second linear polarization component passes through the reflective polarizer 500 and the second polarizer 600 to reach the display panel 10.

When the state of the liquid crystal LQ is the second state LQ2, the light control area MPIX does not change the polarization direction of light. As a result, when the liquid crystal LQ in the light control area MPIX is in the second state LQ2, the light control area MPIX allows the sunlight LL limited to have the first linear polarization component after passing through the first polarizer 300 to reach the reflective polarizer 500 as light with the first linear polarization component. The sunlight LL is reflected by the reflective polarizer 500 and emitted from the first polarizer 300 side to reach the heat absorber 103, as illustrated in FIG. 4. When the state of the liquid crystal LQ is the second state LQ2, the projection light L incident on the light control panel 20 from the display panel 10 side is blocked by the first polarizer 300.

As illustrated in FIGS. 1 and 2, the panel plate surface of the display panel 10 and the panel plate surface of the light control panel 20 are inclined with respect to the projection light L. The display panel 10 is provided in such a state that the panel plate surface is inclined with respect to the projection light L for the purpose of generating a stereoscopic effect (depth) in an image projected onto the projection target such as the windshield 70. The light control panel 20 is provided in such a state that the panel plate surface is inclined so as to cause the sunlight LL to travel toward the heat absorber 103.

In FIG. 2, information on the temperature of the display panel 10 can be obtained by the temperature detector 40, but information on the temperature of the light control panel 20 cannot be obtained. Thus, another configuration may be employed such that the information on the temperature of the light control panel 20 can also be obtained in the same manner as the display panel 10.

Figure 5:
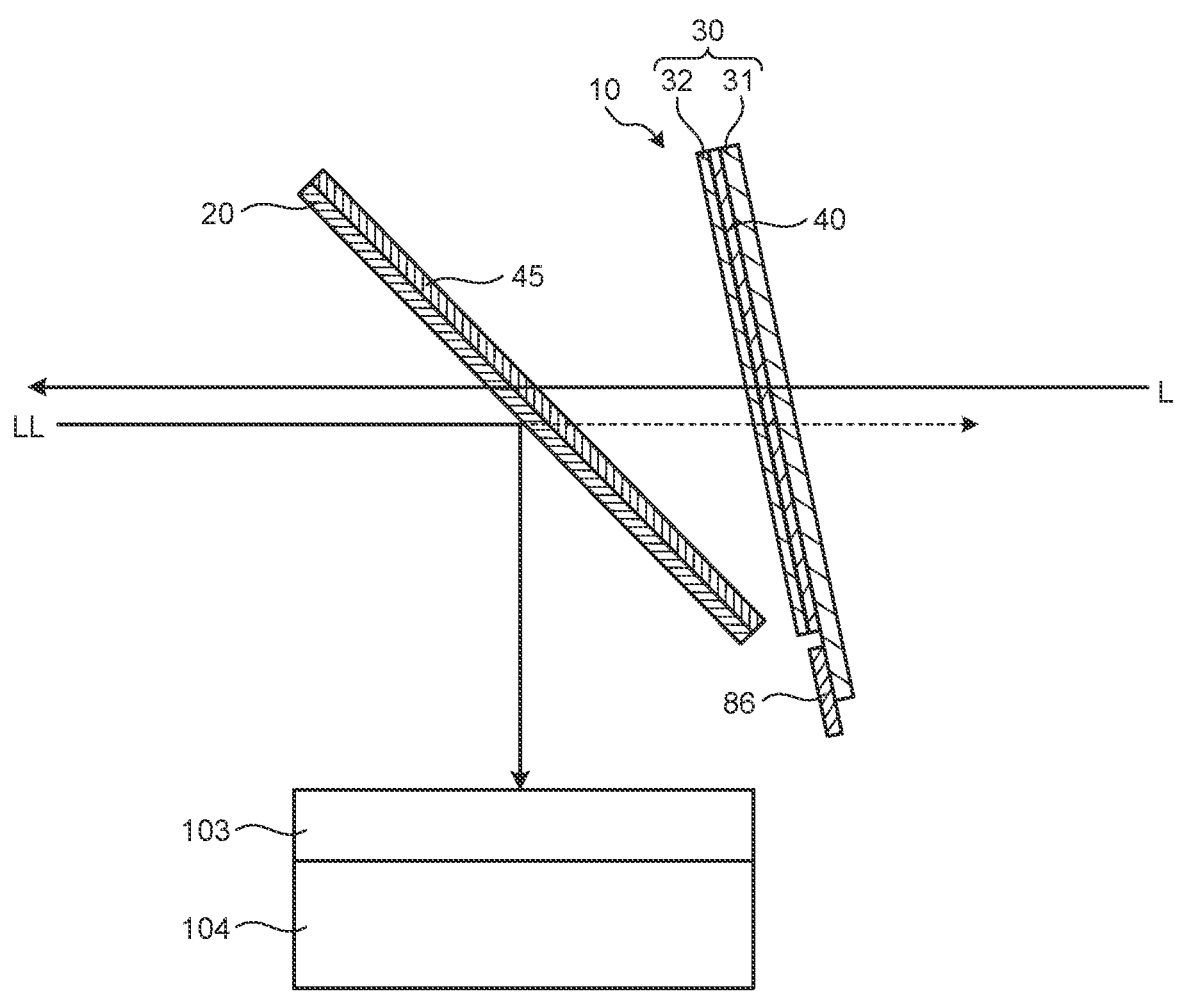
FIG. 5 is a schematic view illustrating an exemplary configuration of the display panel and the light control panel different from the configuration in FIG. 2.

FIG. 5 is a schematic diagram illustrating an exemplary configuration of the display panel 10 and the light control panel 20 different from the configuration in FIG. 2. In the exemplary configuration illustrated in FIG. 5, the light control panel 20 further includes a light control panel temperature detector 45. The light control panel temperature detector 45 has the same structure as the temperature detector 40 except that the light control panel temperature detector 45 is not provided in the display panel 10 but is provided on the light control panel 20. The light control panel temperature detector 45 may be provided as an independent light-transmitting substrate, or may be a circuit layer mounted on the first substrate 402 or the second substrate 406.

The wiring part 86 illustrated in FIGS. 2 and 5 includes wiring parts 82 and 83, which are described later with reference to FIG. 6. When the temperature detector 40 is provided on a light-transmitting substrate independent from the liquid crystal display panel 30, the wiring part 82 extending from the first substrate 31 and the wiring part 83 extending from the temperature detector 40 are provided instead of the wiring part 86.

The display panel 10 and the light control panel 20 are coupled to the controller 110. The following explains the controller 110 with reference to FIGS. 6 and 7.

Figure 6:
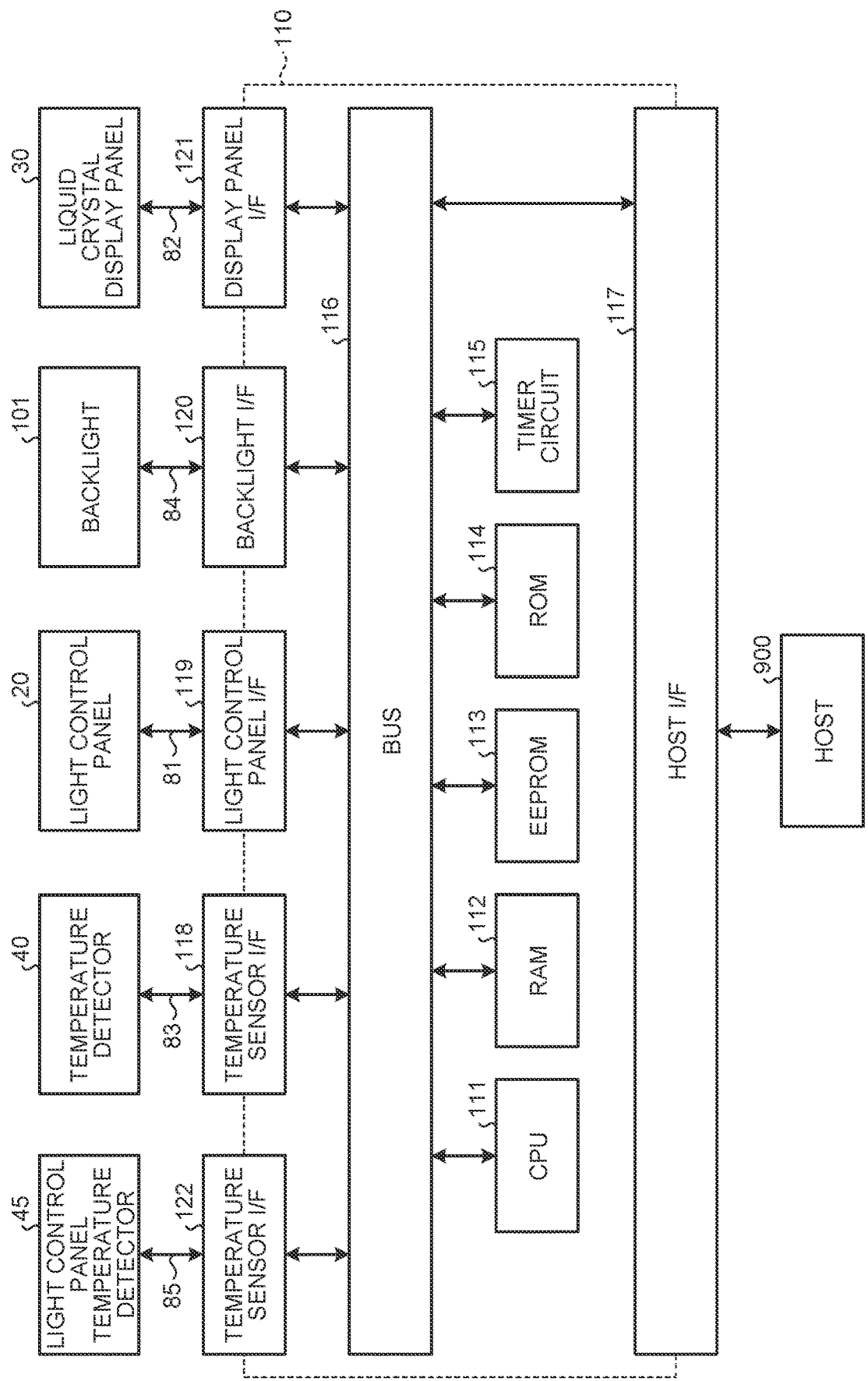
FIG. 6 is a block diagram illustrating an exemplary structure of the controller.

FIG. 6 is a block diagram illustrating an exemplary structure of the controller 110. The controller 110 includes a central processing unit (CPU) 111, a random access memory (RAM) 112, an electrically erasable programmable read only memory (EEPROM) 113, a read only memory (ROM) 114, a timer circuit 115, a bus 116, a host interface (I/F) 117, the temperature sensor I/F 118, a light control panel I/F 119, a backlight I/F 120, and a display panel I/F 121. The controller 110 is mounted on a substrate (not illustrated) provided inside the housing.

The CPU 111 performs various types of arithmetic processing. The RAM 112 stores therein temporary data generated by the arithmetic processing performed by the CPU 111. The EEPROM 113 stores therein, in a rewritable state, at least one of software programs to be read out in the arithmetic processing performed by the CPU 111 and the data read out in the execution of the software program. The ROM 114 stores therein, in a non-rewritable state, at least one of software programs read out the arithmetic processing performed by the CPU 111 and the data read out in executing the software programs. At least one of the EEPROM 113 and the ROM 114 stores therein the software programs that are read out in the arithmetic processing performed by the CPU 111.

The timer circuit 115 counts a lapse of time. The CPU 111 refers to the count value counted by the timer circuit 115 in the arithmetic processing in which the lapse of time is used as a parameter.

The bus 116 couples the various constituent units included in the controller 110. A host 900 is coupled to the host I/F 117. The host 900 is an external image output device. The display system 1 projects a virtual image VG corresponding to an image signal received from the host 900. The wiring part 83 of the temperature detector 40 is coupled to the temperature sensor I/F 118. The wiring part 81 of the light control panel 20 is coupled to the light control panel I/F 119. The wiring part 84 of the backlight 101 is coupled to the backlight I/F 120. The wiring part 82 of the liquid crystal display panel 30 is coupled to the display panel I/F 121.

When the light control panel temperature detector 45 explained with reference to FIG. 5 is provided, the controller 110 further includes a temperature sensor I/F 122. The wiring part 85 of the light control panel temperature detector 45 is coupled to the temperature sensor I/F 122. When the light control panel temperature detector 45 explained with reference to FIG. 5 is not provided, the temperature sensor I/F 122 is omitted.

The wiring parts 81, 82, 83, 84, 85, 86 are flexible printed circuits (FPCs), for example, but are not limited to those. The wiring parts 81, 82, 83, 84, 85, 86 only need to be capable of being coupled to the controller 110 and include wiring lines. Their specific structures can be appropriately changed.

Figure 7:
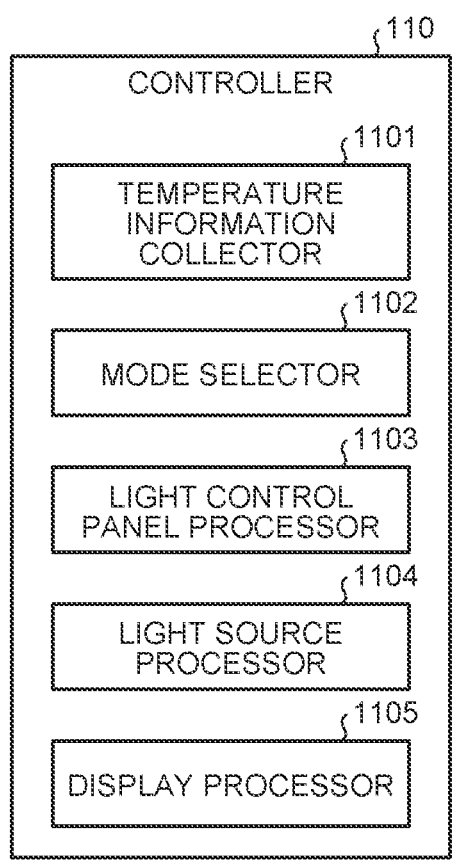
FIG. 7 is a block diagram illustrating a functional structure of the controller.

FIG. 7 is a block diagram illustrating a functional structure of the controller 110. The controller 110 functions as a temperature information collector 1101, a mode selector 1102, a light control panel processor 1103, a light source processor 1104, and a display processor 1105, as a result of arithmetic processing performed by the CPU 111.

The temperature information collector 1101 operates the temperature detector 40 to collect information indicating the temperature of each partial temperature detection area PA included in the temperature detector 40. Specifically, the temperature information collector 1101 applies the drive signal to the input line Vin of the wiring part 83, and identifies the temperature of the temperature detection resistor ER in each partial temperature detection area PA based on the intensity of the signal output from the output line Vout. When the light control panel temperature detector 45 is provided, the temperature information collector 1101 further operates the light control panel temperature detector 45 to collect information indicating the temperature of each partial temperature detection area PA included in the light control panel temperature detector 45.

Data indicating the correspondence relation between the intensity of the signal that is output from the output line Vout and the temperature of the temperature detection resistor ER is stored in at least one of the EEPROM 113 and the ROM 114. The data may be threshold data allowing determination based on the signal whether the temperature of the temperature detection resistor ER is equal to or higher than a predetermined temperature. As a more specific example, the data may be threshold data allowing determination based on the signal whether the temperature of the temperature detection resistor ER is lower than a first temperature, equal to or higher than the first temperature and lower than a second temperature, equal to or higher than the second temperature and lower than a third temperature, or equal to or higher than the third temperature. In other words, the data needs not be data by which the temperature of the temperature detection resistor ER is identified in an accurate numerical form. Of course, the data may be data by which the temperature of the temperature detection resistor ER can be identified in an accurate numerical form.

The mode selector 1102 determines an operation mode of the display system 1 based on the information indicating the temperature of the partial temperature detection area PA obtained by the temperature information collector 1101. Details of the operation mode are described later.

The light control panel processor 1103 controls the operation of the light control panel 20 based on the information indicating the temperature of the partial temperature detection area PA obtained by the temperature information collector 1101 and the operation mode selected by the mode selector 1102.

The light source processor 1104 controls the operation of the backlight 101 based on the information indicating the temperature of the partial temperature detection area PA obtained by the temperature information collector 1101 and the operation mode selected by the mode selector 1102.

The display processor 1105 controls the operation of the liquid crystal display panel 30 in accordance with the image signal received from the host 900.

The following explains a basic concept of the operation of the display system 1 with reference to FIGS. 8 to 10, prior to the explanation of the operating mode.

FIG. 8 is a schematic view illustrating the operations of the light control panel 20, the liquid crystal display panel 30, the temperature detector 40, and the backlight 101 in a normal display mode. In FIGS. 8 to 10, the light control panel 20, the liquid crystal display panel 30, and the temperature detector 40 are separated from each other. However, the light control panel 20, the liquid crystal display panel 30, and the temperature detector 40 are actually in contact with one another, as explained with reference to FIG. 2. In FIGS. 8 to 10, the partial temperature detection areas PA are illustrated in a 2×3 array, and individual control areas of the light control areas MPIX in an active area RA of the light control panel 20 are also illustrated in a 2×3 array. This is only schematic to simplify the explanation and illustration. In particular, when individually controllable light control areas MPIX are individually controlled, the light control area MPIX has at most substantially the same level of resolution as the pixels of the liquid crystal display panel 30. In the individually controllable light control areas MPIX, transmission (the first state LQ1) or reflection (the second state LQ2) can be controlled for each individual area according to the display state of the corresponding pixel. The active area RA in FIG. 8 is the area in which the multiple (six in FIG. 8) light control areas MPIX are arranged in the light control panel 20.

The backlight 101 includes a plurality of light sources. The backlight 101 can be switched between on and off individually for each coordinate area of the partial temperature detection area PA explained with reference to FIGS. 6 and 7. Specifically, for example, a separate light source is provided for each coordinate area of the partial temperature detection areas PA.

When the temperature of the liquid crystal display panel 30 is lower than the predetermined temperature, all of the light sources are turned on. In FIGS. 8 to 10, the light source that is turned on is illustrated as the lighting-on light source ALA with a dot pattern. Light from the lighting-on light sources ALA passes through the temperature detector 40. After that, the light passes through the liquid crystal display panel 30 as the projection light L that illuminates the liquid crystal display panel 30 from the other surface side (rear side) thereof and projects the virtual image VG, and travels toward one surface side (a projection side) of the liquid crystal display panel 30. The projection light L is projected onto the projection target (e.g., windshield 70) after passing through the light control panel 20 controlled to allow all of the light control areas MPIX to transmit light. The predetermined temperature is, for example, the first temperature (60° C.), which is described later, but is not limited to this temperature. Details of the predetermined temperature are described later.

FIG. 9 is a schematic view illustrating a temperature rise mechanism in the liquid crystal display panel 30. When the sunlight LL explained with reference to FIG. 1 reaches the position of the display panel 10 and the temperature of the liquid crystal display panel 30 is still lower than the predetermined temperature, the light control panel 20 is in the state of transmitting light (the first state LQ1). The sunlight LL, thus, reaches the liquid crystal display panel 30. The sunlight LL raises the temperature of the liquid crystal display panel 30. In particular, because the polarizer provided on the liquid crystal display panel 30 does not transmit light other than light polarized in a specific direction, the polarizer acts to block most of the sunlight LL, resulting in rising the temperature of the polarizer. This causes the temperature of the liquid crystal display panel 30 in which the polarizer is adhesively bonded to rise. In FIG. 9, a hot spot HS is illustrated as the place where the temperature has increased due to sunlight LL in the display area AA of the liquid crystal display panel 30. Heat in the hot spot HS is transferred to a high temperature area APA, which is the partial temperature detection area PA at the position overlapping with the hot spot HS. As a result, the temperature of the temperature detection resistor ER disposed in the high temperature area APA rises, whereby the output from the output line Vout coupled to the temperature detection resistor ER reflects the temperature rise.

FIG. 10 is a view illustrating a mechanism in which local reflection of the sunlight LL by the light control panel 20 restrains the temperature rise in the liquid crystal display panel 30. When a temperature rises in the liquid crystal display panel 30, such as the hot spot HS explained with reference to FIG. 9, is detected in the high temperature area APA, the control is performed such that the light control area MPIX at the position overlapping with the hot area APA reflects light. FIG. 10 illustrates the state of the liquid crystal LQ in the light control area MPIX at the position overlapping with the high temperature area APA illustrated in FIG. 9 as the second state LQ2. The sunlight LL is reflected in the light control area MPIX in which the state of the liquid crystal LQ is the second state LQ2, and reaches the heat absorber 103, thereby restraining concentrated irradiation of the sunlight LL on the liquid crystal display panel 30. As a result, a further temperature increase at the hot spot HS illustrated in FIG. 9 can be restrained.

The following explains the detailed operations of the liquid crystal display panel 30, the backlight 101, and the light control panel 20. The operation mode (the normal display mode) when the high temperature area APA (refer to FIG. 9 and the like) does not occur is explained with reference to FIGS. 11 and 12.

Figure 11:
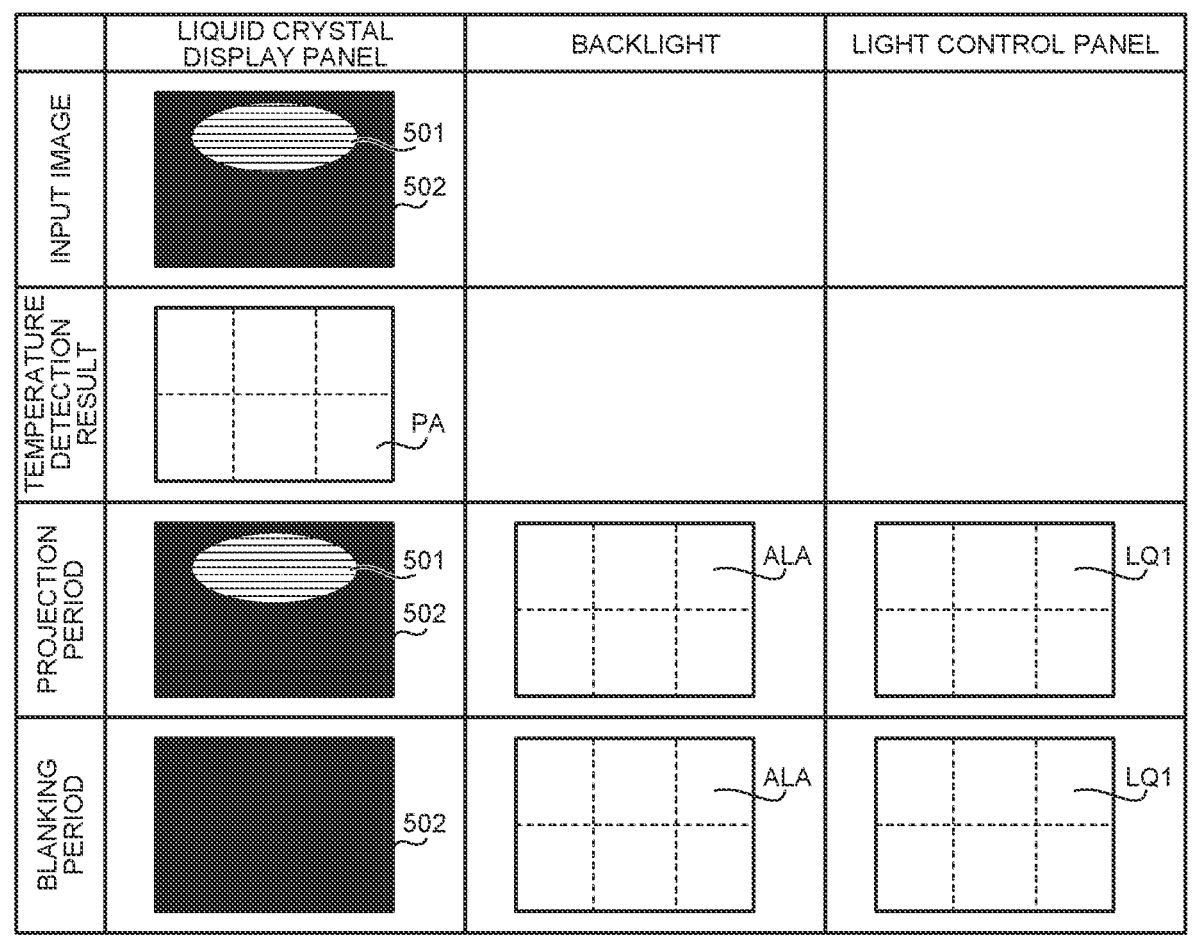
Figure 12:
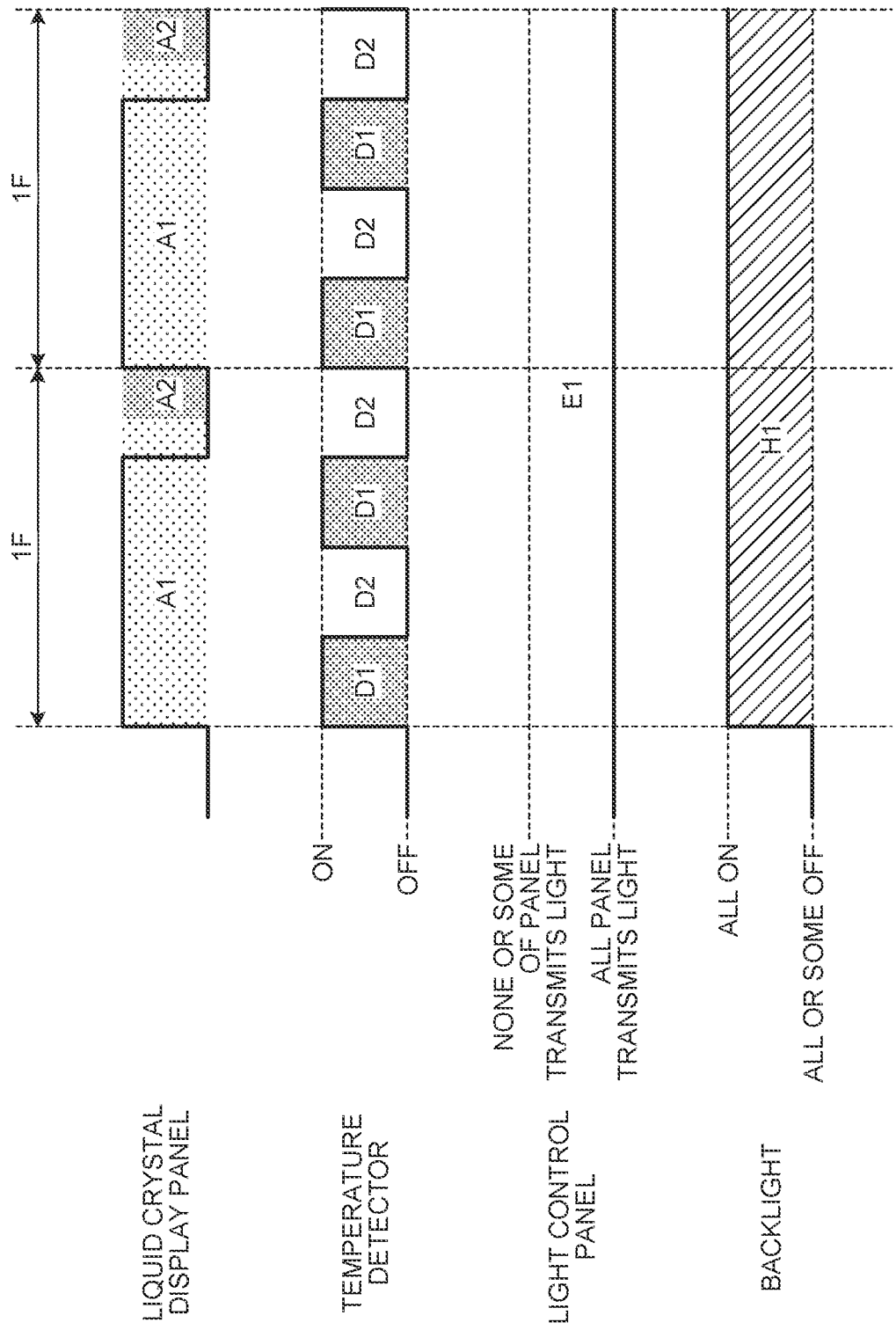
FIG. 12 is a timing chart illustrating the exemplary operations of the liquid crystal display panel, the temperature detector, the backlight, and the light control panel in the normal display mode.

FIG. 11 is a table schematically illustrating exemplary operations of the liquid crystal display panel 30, the backlight 101, and the light control panel 20 in the normal display mode. FIG. 12 is a timing chart illustrating the exemplary operations of the liquid crystal display panel 30, the temperature detector 40, the backlight 101, and the light control panel 20 in the normal display mode.

During a projection period (display period) in which an image is projected onto the projection target (e.g., windshield 70) by the display system 1, the display processor 1105 drives each of the pixels included in the liquid crystal display panel 30 in accordance with the input image explained in the "input image" row to cause the liquid crystal display panel 30 to produce an output corresponding to the input image. The "display panel" column in the "projection period" row in FIG. 11 illustrates that the same output as in the "input image" row is produced. The input image exemplarily illustrated in FIG. 11, FIG. 13, which is described later, and other figures includes a display area 501 and a non-display area 502. The display area 501 is an image area in which the pixels of the liquid crystal display panel 30 are controlled so as to transmit light from the backlight 101. The non-display area 502 is an image area in which the pixels of the liquid crystal display panel 30 are controlled so as not to transmit light from the backlight 101.

The input image is a frame image that is input multiple times per second according to a predetermined refresh rate. As illustrated in FIG. 12, the operation control of the display system 1 is performed on a frame period 1F basis. Every lapse of the frame period 1F, the input image (frame image) for the liquid crystal display panel 30 is updated, and the display output is updated by the liquid crystal display panel 30. Specifically, the display processor 1105 causes the liquid crystal display panel 30 to operate such that the display output is updated each time a new frame image is input. Because of this operation, the operation of the liquid crystal display panel 30 includes a blanking period. During the blanking period, the pixels of the liquid crystal display panel 30 are reset. In the "blanking period" of FIG. 11, the pixels of the liquid crystal display panel 30 are reset, and the entire display area AA becomes the non-display area 502. The period A1 included in the "liquid crystal display panel" column in the timing chart illustrated in FIG. 12 corresponds to the "projection period" in FIG. 11. The period A2 included in the "liquid crystal display panel" column in the timing chart illustrated in FIG. 12 corresponds to the "blanking period" in FIG. 11.

As illustrated in FIG. 12, in the embodiment, temperature detection by the temperature detector 40 is performed at a higher frequency than the update frequency of the frame image performed every lapse of the frame period 1F. In the example illustrated in FIG. 12, FIG. 14, which is described later, and other figures, the temperature detector 40 operates in the period D1 to detect the temperature, and the temperature detector 40 becomes a non-operation state in the period D2.

In the "temperature detection result" in FIG. 11, FIG. 13, which is described later, and other figures, the result of temperature detection by the temperature detector 40 is exemplarily illustrated with the same concept as the relation between the partial temperature detection area PA and the high temperature area APA of the temperature detector 40 exemplarily illustrated in FIG. 8 and other figures. In the example illustrated in FIG. 11, the "temperature detection result" does not include high temperature area APA. In other words, in the example illustrated in FIG. 11, the high temperature area APA does not occur. In such a case, the display system 1 operates in the normal display mode. Specifically, the light source processor 1104 causes the backlight 101 to operate in a first light emission mode. In the first light emission mode, all of the light sources emit light. The backlight 101 in the normal display mode is on all the time during the operation period of the display system 1. In other words, all of the light sources included in the backlight 101 are the lighting-on light sources ALA (refer to FIG. 8), regardless of whether in the projection period or the blanking period. In FIG. 12, in the period H1, all of the light sources are the lighting-on light sources ALA, and the period H1 corresponds to all of the frame periods 1F.

In the light control panel 20 in the normal display mode, the state of the liquid crystal LQ in all of the light control areas MPIX is the first state LQ1, regardless of whether in the projection period or the blanking period. In FIG. 12, in the period E1, the state of the liquid crystal LQ in all of the light control areas MPIX is in the first state LQ1, and the period E1 corresponds to all of the frame periods 1F. In the embodiment, the state in which the liquid crystal LQ in all of the light control areas MPIX is in the first state LQ1 is the state in which the light control panel 20 is not operated. This operation mode of the light control panel 20 may be described as a sleep mode.

The following explains, with reference to FIGS. 13 to 16, the operation mode when the above-mentioned high temperature area APA (refer to FIG. 9 and the like) occurs.

Figure 14:
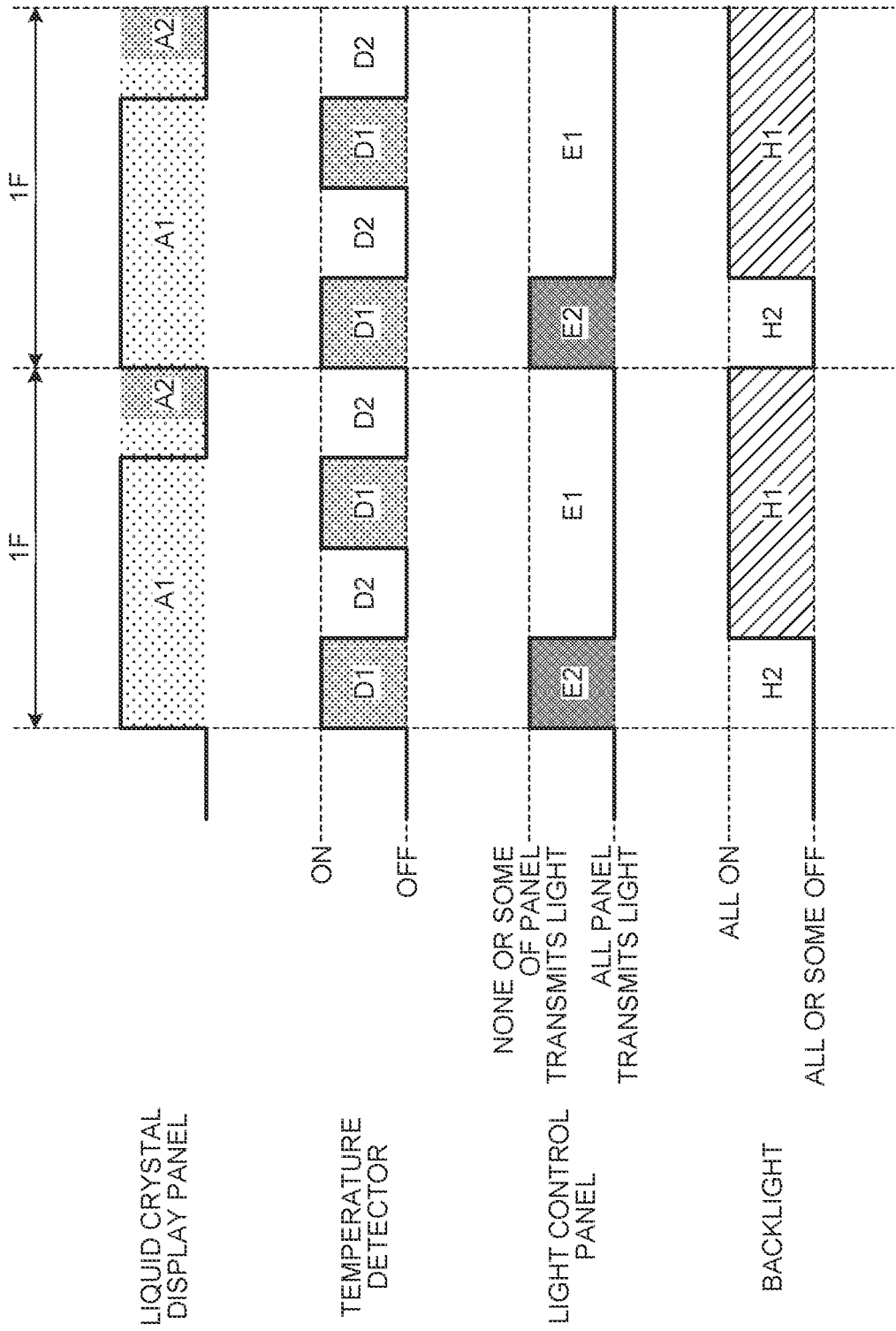
FIG. 14 is a timing chart illustrating exemplary operations of the liquid crystal display panel, the temperature detector, the backlight, and the light control panel in the operation mode when a high temperature area occurs.

FIG. 13 is a table schematically illustrating exemplary operations of the liquid crystal display panel 30, the backlight 101, and the light control panel 20 when an all reflection mode is applied. FIG. 14 is a timing chart illustrating the exemplary operations of the liquid crystal display panel 30, the temperature detector 40, the backlight 101, and the light control panel 20 in an operation mode when the high temperature area APA occurs.

In FIG. 13 and FIG. 15, which is described later, the position of the high temperature area APA in the "temperature detection result" row indicates that the temperature of a part of the panel plate surface of the liquid crystal display panel 30 is equal to or higher than a predetermined temperature. Specifically, in a case where the outputs from the partial temperature detection areas PA in six (2×3) partial areas of the panel plate surface of the liquid crystal display panel 30 are individually obtained, the "temperature detection result" row indicates that the outputs from the two partial temperature detection areas PA in the middle section correspond to the high temperature area APA. The temperature information collector 1101 obtains the outputs corresponding to the states of the partial temperature detection areas PA and the high temperature area APA in the "temperature detection result" row. The mode selector 1102 determines that the temperature of the liquid crystal display panel 30 is equal to or higher than the predetermined temperature (e.g., equal to or higher than 60° C.) in the two areas overlapping with the high temperature area APA.

When the high temperature area APA occurs, the controller 110 sets the operating mode of the display system 1 to the all reflection mode, for example. In the all reflection mode, the projection period, that is, a part of the output period of the image from the liquid crystal display panel 30, is the all reflection mode period. Specifically, the period that overlaps with periods E2 and H2 in the period A1 in FIG. 14 is the all reflection mode period. During the period that overlaps with periods E1 and H1 in the period A1 in FIG. 14, the display system 1 operates in the same manner as the normal display mode described above, and the state of the display system 1 is the same as that indicated in the "projection period" illustrated in FIG. 13.

During the all reflection mode period, the light control panel processor 1103 causes the light control panel 20 to operate in a first reflection mode. In the light control panel 20 operating in the first reflection mode, the light control areas MPIX (the two areas in the middle row in FIG. 13) overlapping with the high temperature area APA in front view are in the second state LQ2, as indicated in the "light control panel" column in FIG. 13 in the "all reflection mode period". In other words, in the first reflection mode, external light is reflected by the light control areas MPIX (the two areas in the middle row in FIG. 13) overlapping with the high temperature area APA. The area with the second state LQ2 in the first reflection mode is included in a local reflection area in the flowchart (FIGS. 17 to 19) described later. In the first reflection mode, the light control areas MPIX that do not overlap with the high temperature area APA are in the first state LQ1. In FIG. 14, during the period E2, the light control panel 20 operates in the first reflection mode.

A reset operation on the light control panel 20 switches between the period E2 and period E1. In the embodiment, the state of the light control panel 20 in the period E1, that is, the state of the light control panel 20 that is in the sleep mode, is caused by the reset operation performed on the light control panel 20 under the same concept as the operation (reset operation) for the liquid crystal display panel 30 to enter the blanking period.

During the all reflection mode period, the light source processor 1104 causes the backlight 101 to turn off all of the light sources. As a result, during the all reflection mode period, any image for making the virtual image VG visible is not projected. In FIG. 14, during the period H2, all of the light sources in the backlight 101 are in the lighting-off-state BLA.

The operation mode when the high temperature area APA (refer to FIG. 9 and the like) occurs is not limited to the all reflection mode. The following explains a partial reflection mode, which differs from the all reflection mode, with reference to FIGS. 15 and 16.

FIG. 15 is a table schematically illustrating exemplary operations of the liquid crystal display panel 30, the backlight 101, and the light control panel 20 when the partial reflection mode is applied.

When the high temperature area APA occurs, the controller 110 sets the operating mode of the display system 1 to the partial reflection mode, for example. In the partial reflection mode, the projection period, that is, a part of the output period of the image from the liquid crystal display panel 30, is the partial reflection mode period. Specifically, the period that overlaps with the periods E2 and H2 in the period A1 in FIG. 14 is the partial reflection mode period. During the period that overlaps with periods E1 and H1 in the period A1 in FIG. 14, the display system 1 operates in the same manner as the normal display mode described above, and the state is the same as that indicated in the "projection period" illustrated in FIG. 13.

During the partial reflection mode period, the light control panel processor 1103 causes the light control panel 20 to operate in a second reflection mode. In the second reflection mode, in the light control areas MPIX overlapping with the high temperature area APA, the part corresponding to the display area 501 (in FIG. 15, the part corresponding to the oval shape corresponding to the display area 501) is in the first state LQ1, and the part corresponding to the non-display area 502 is in the second state LQ2. In other words, in the second reflection mode, the image on the display area 501 passes through the light control panel 20, and external light is reflected by only the non-display area 502. The area with the second state LQ2 in the second reflection mode is included in the local reflection area in the flowchart (FIGS. 17 to 19) described later.

As described above, the light control panel processor 1103 has two reflection modes (the first and the second reflection modes) for the light control panel 20. The light control panel processor 1103 also has the sleep mode in which the light control panel 20 is not operated. In this case, the entire light control areas MPIX are in the first state LQ1. As a result, the image of the display panel 10 passes through the light control panel 20 to reach the concave mirror 60 while external light from the concave mirror 60 also passes through the light control panel 20 to reach the display panel 10.

During the partial reflection mode period, the light source processor 1104 causes the backlight 101 to operate in a second light emission mode. In the second light emission mode, only the light sources corresponding to the part contributing to the display are caused to emit light, and the remaining light sources are turned off.

Figure 17:
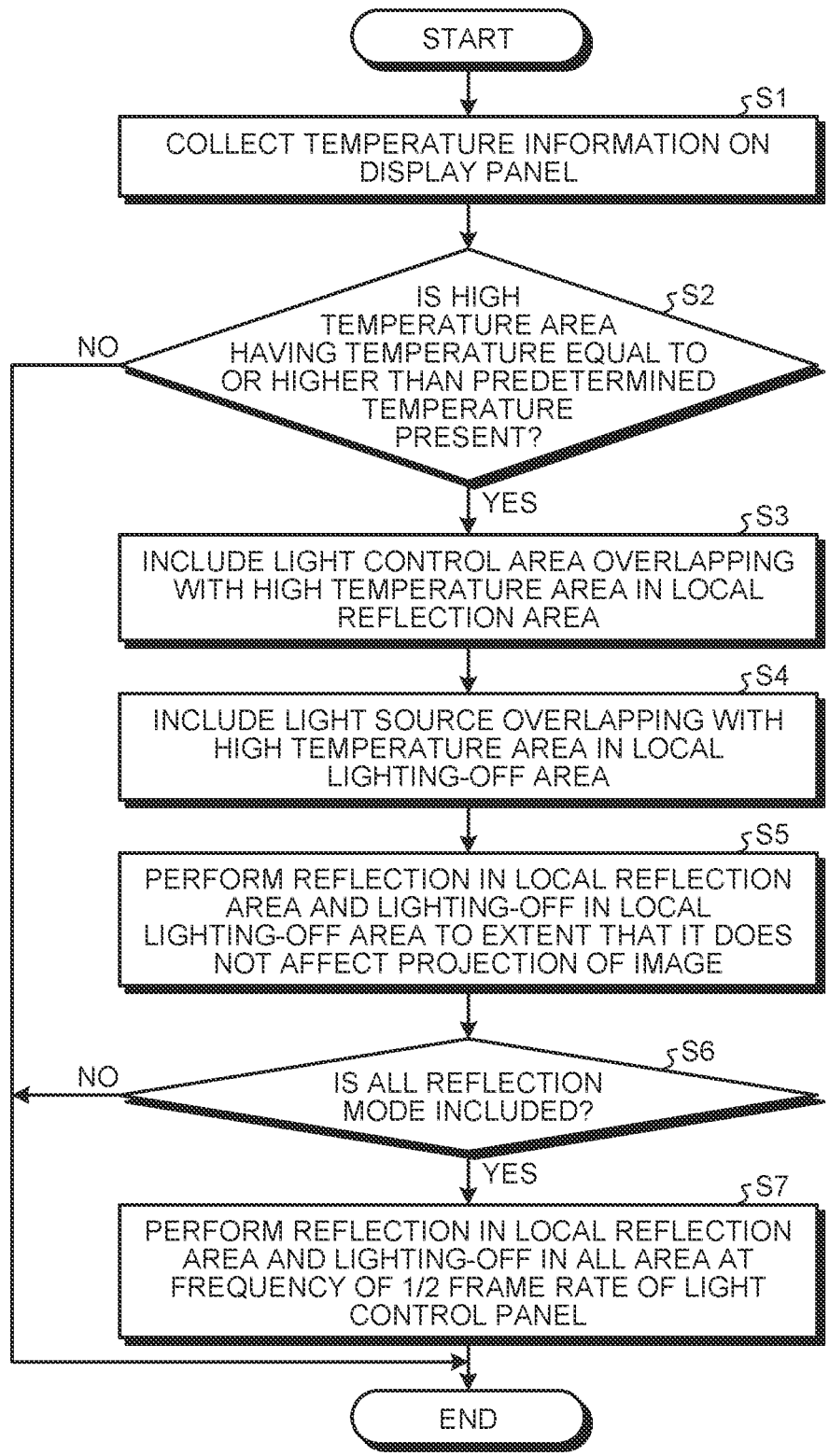
FIG. 17 is a flowchart illustrating an exemplary operation of the display system.
Figure 18:
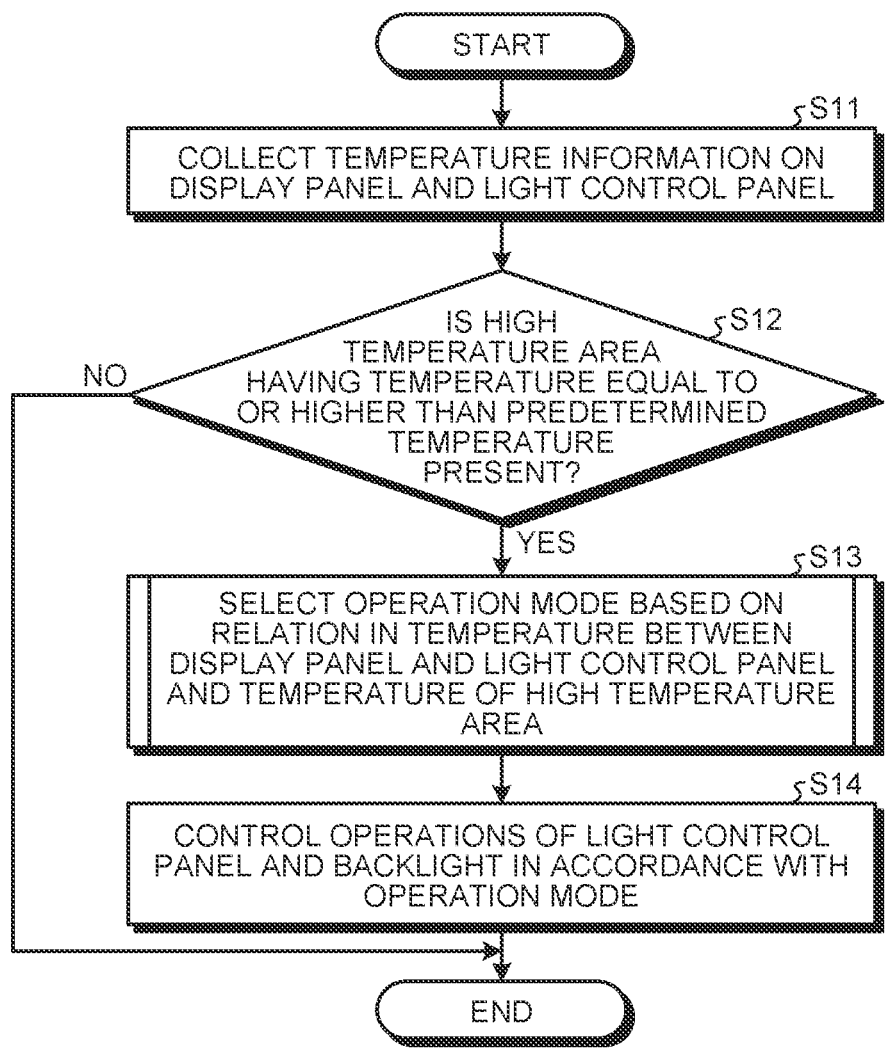
FIG. 18 is a flowchart illustrating an exemplary control process based on a result of a comparison between a temperature of a partial temperature detection area in a light control panel temperature detector and a temperature of the partial temperature detection area in the temperature detector.
Figure 19:
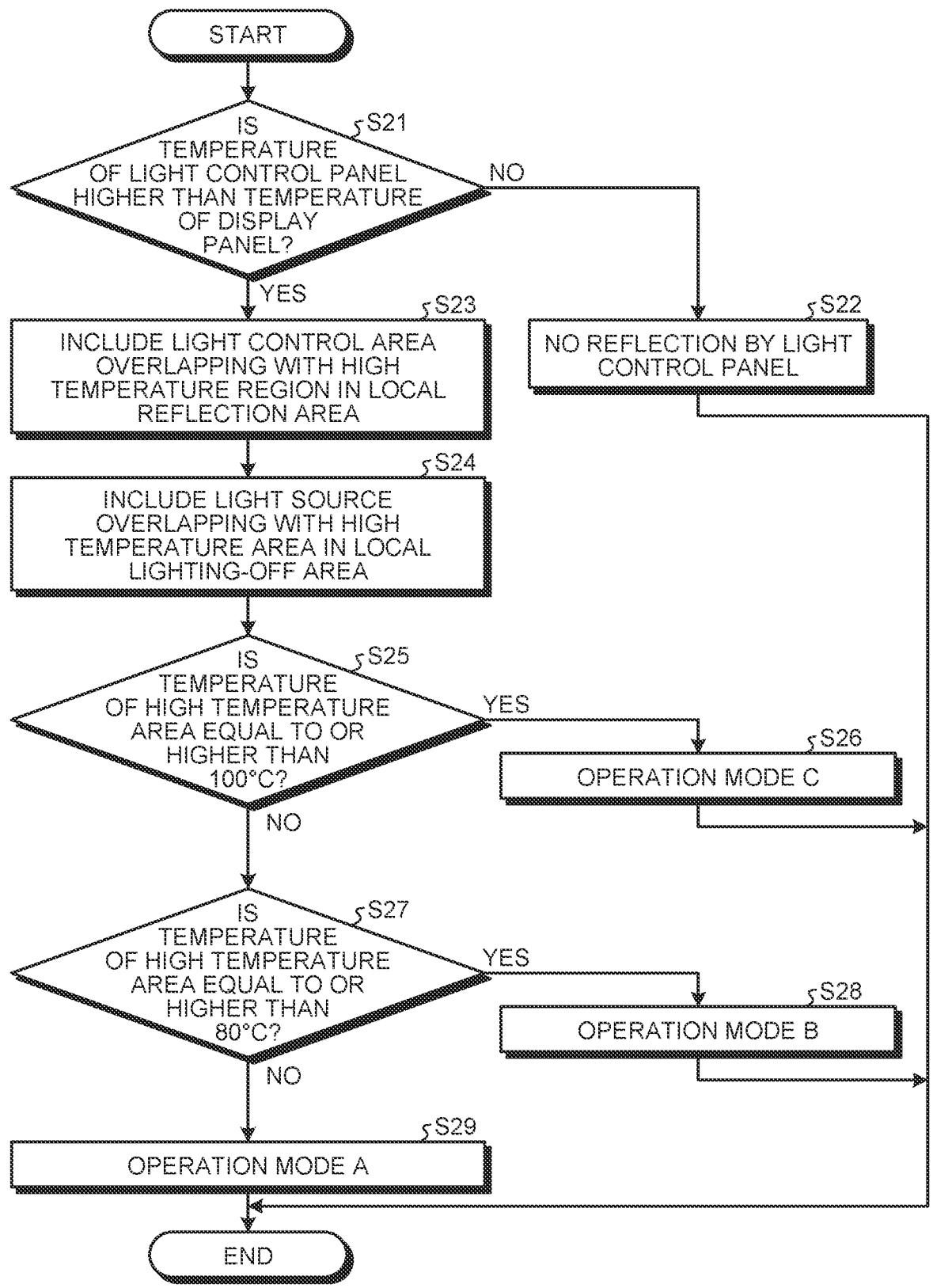
FIG. 19 is a flowchart illustrating an exemplary specific processing at step S13 illustrated in FIG. 18.

Specifically, in the second light emission mode, among the light sources included in the backlight 101, the light sources are turned on that are located in the position overlapping with the display area 501 in the front view of the plane orthogonal to the projection light L that passes through the display panel 10 and the light control panel 20 in FIG. 1, while the remaining light sources are turned off. In FIG. 15, the backlight 101 operates in the second light emission mode during the "partial reflection mode period". As a result, in the 2×3 partial areas, the light sources are on in the 1×3 upper partial areas, while the light sources are off in the 1×3 lower partial areas. The 1×3 upper partial areas are areas overlapping with the display area 501, and the 1×3 lower partial areas are areas not overlapping with the display area 501. At least a part of the area where the light sources are not turned on overlaps with at least a part of a local lighting-off area in the flowchart described later (FIGS. 17 to 19).

As described above, the light source processor 1104 causes the backlight 101 to emit light in the two light emission modes (the first and the second light emission modes). The light source processor 1104 also has a lighting-off mode in which all of the light sources are turned off as described above. The light source processor may have only the second light emission mode and the lighting-off mode. In this case, the backlight operates in the second light emission mode instead of the first light emission mode.

In the embodiment, the state of the liquid crystal LQ in the light control area MPIX can be switched for each region that overlaps with the partial temperature detection area PA of the temperature detector 40 in front view. Specifically, one or more of the light control areas MPIX are provided in each of the regions that respectively overlap with the partial temperature detection areas PA of the temperature detector 40 in front view. When more than one light control area MPIX is provided in each of the regions that respectively overlap with the partial temperature detection areas PA in front view, operation control is performed using, as a set of light control areas MPIX, the more than one light control area MPIX located within the region overlapping with one partial temperature detection area PA in front view. The light control panel processor 1103 controls the state of the liquid crystal LQ in the light control area MPIX on a set-by-set basis.

As exemplarily explained with reference to FIGS. 11 to 15, the light control panel processor 1103 and the light source processor 1104 are synchronized with each other, which causes the light control panel 20 and the backlight 101 to change their operation modes at the same time. More specifically, the light control panel processor 1103 and the light source processor 1104 respectively drive the light control panel 20 and the backlight 101 at a predetermined frame rate, and the sleep mode of the light control panel 20 coincides with the first light emission mode of the backlight 101. As a result, the image is projected over the entire display area during the period in which the modes coincide with each other. Such operation is referred to as the normal display mode. Specifically, the states of the liquid crystal display panel 30, the backlight 101, and the light control panel 20 in the "projection period" illustrated in FIGS. 11, 13, and 15 are the states of the liquid crystal display panel 30, the backlight 101, and the light control panel 20 in the normal display mode.

When the light control panel 20 is in the second reflection mode, the backlight 101 is in the second light emission mode. In this case, the display is maintained even when a high temperature area is present in the display area, while the light control panel 20 is in the first state and the backlight 101 is turned off in the non-display area, thereby restraining the supply of more heat from external light, the backlight 101, and the like to the high temperature area. As a result, the temperature of the high temperature area is reduced. In the explanation of the embodiment, this operation is referred to as the partial reflection mode, as described above.

When the light control panel 20 is in the first reflection mode, the backlight 101 is in the lighting-off mode. In this case, even though the high temperature area is present in the display area, all of the high temperature areas including the high temperature area in the display area are subjected to external light reflection by the light control panel 20 and is not irradiated with light from the backlight 101. In this way, all the high temperature areas are subjected to external light reflection and irradiated with no light from backlight. This allows the temperature of the high temperature area to be more efficiently reduced while a situation occurs where no display (projection) is made for a certain period of time. In the following explanation of the embodiment, this operation is referred to as the all reflection mode, as described above.

In the embodiment, the refresh rate of the liquid crystal display panel 30, that is, an update frequency of the projection image, is 30 fps, for example. A temperature acquisition frequency of the temperature detector 40 is 60 fps, for example. In contrast, the update frequency (frame rate) of the operation states of the light control panel 20 and the backlight 101 can be either 60 fps or 30 fps. When the frame rate of the operation states of the light control panel 20 and the backlight 101 is 60 fps, the operation period of the light control panel 20 occurs twice in one frame period of the liquid crystal display panel 30. When the frame rate of the operation states of the light control panel 20 and the backlight 101 is 30 fps, the operation period of the light control panel 20 occurs one time in one frame period of the liquid crystal display panel 30.

Figure 16:
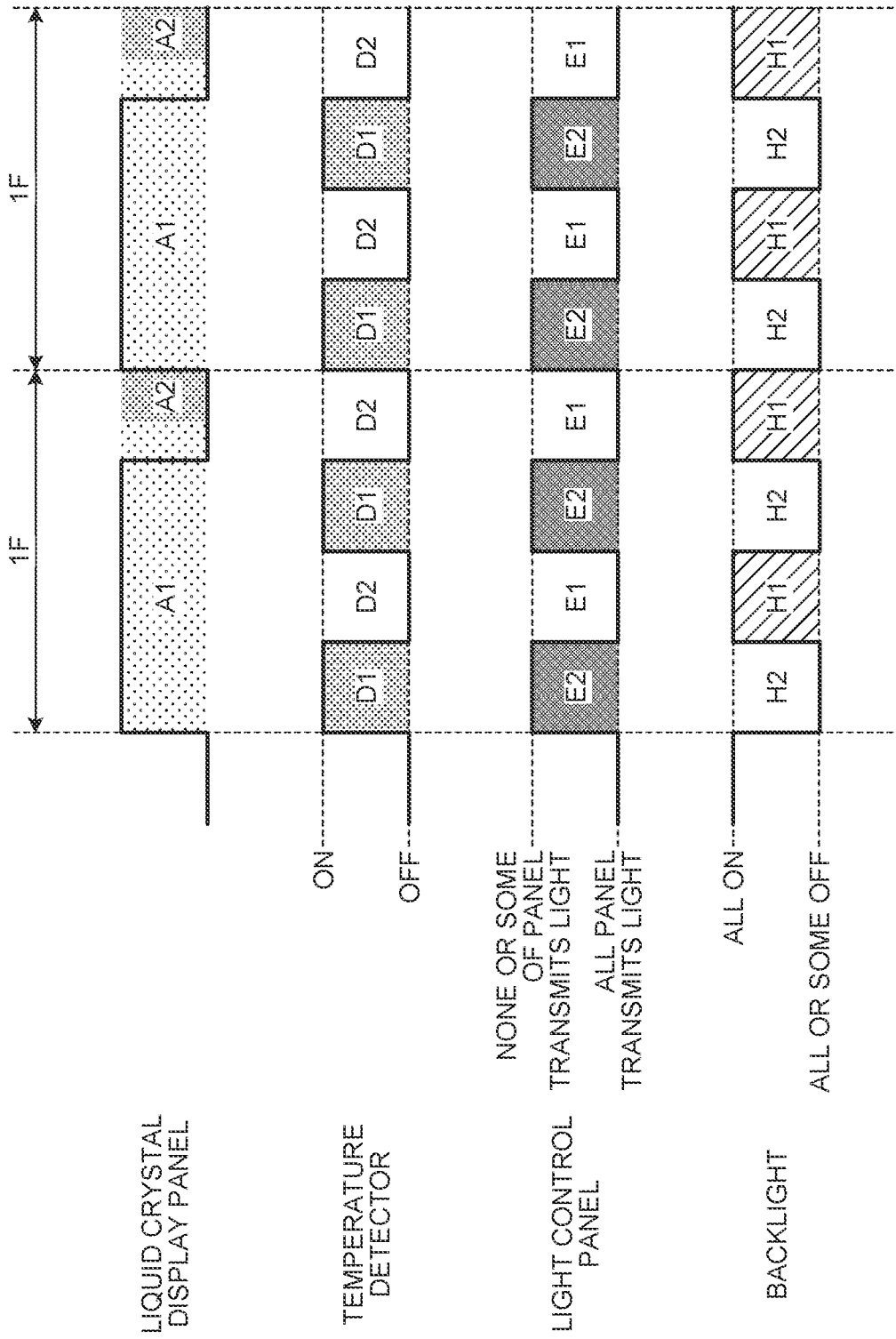
FIG. 16 is a timing chart illustrating the exemplary operations of the liquid crystal display panel, the temperature detector, the backlight, and the light control panel in the operation mode when the high temperature area occurs.

FIG. 16 is a timing chart illustrating exemplary operations of the liquid crystal display panel, the temperature detector 40, the backlight 101, and the light control panel 20 in the operation mode when the high temperature area APA occurs. The example illustrated in FIG. 14 illustrates a case where the frame rate of the operation states of the light control panel 20 and the backlight 101 is 30 fps. The example illustrated in FIG. 16 illustrates a case where the frame rate of the operation states of the light control panel 20 and the backlight 101 is 60 fps. In the example illustrated in FIG. 14, an overlapping period in which the period A1 overlaps with the periods E2 and H2 occurs once in the frame period 1F, while in the example illustrated in FIG. 16, the overlapping period in which the period A1 overlaps with the periods E2 and H2 occurs twice in the frame period 1F.

The display system in the embodiment typically operates in the normal display mode, but the display system operates in the normal display mode and the partial reflection mode alternately depending on the temperature of the display panel detected by the temperature detector. The user can also set whether the all reflection mode is incorporated in the sequence of the display system.

The following explains, with reference to FIG. 17, a process of operation control of the display system 1 based on the outputs from the output lines Vout of the temperature detector 40 in the structure of the display system 1 illustrated in FIG. 2.

FIG. 17 is a flowchart illustrating an exemplary operation of the display system 1. Here, the display system is assumed to be currently driven in the normal display mode. First, the temperature information on the liquid crystal display panel 30 is collected (step S1). Specifically, the temperature information collector 1101 outputs the drive signal to the temperature detector 40 and collects the outputs from the output lines Vout. The processing at step S1 provides information indicating the temperature of each partial temperature detection area PA, that is, the temperature of each part of the liquid crystal display panel 30 that overlaps with a corresponding one of the partial temperature detection areas PA.

After the processing at step S1, the mode selector 1102 determines whether the partial temperature detection area PA is present that has become the high temperature area APA having a temperature equal to or higher than the predetermined temperature (step S2). If it is determined that the partial temperature detection area PA is present that has become the high temperature area APA having a temperature equal to or higher than the predetermined temperature (Yes at step S2), the light control panel processor 1103 includes, in the local reflection area, the light control area MPIX that overlaps with the high temperature area APA in front view (step S3). The light source processor 1104 includes, in the local lighting-off area, the light source that overlaps with the high temperature area APA in plan view (step S4). The processing at step S3 and the processing at step S4 are performed in random order.

After the processing at steps S3 and S4, the partial reflection mode is incorporated into the normal display mode (an operating mode A). As a result, the part that does not influence the display in the high temperature section APA is subjected to the external light reflection and the turning-off of the backlight 101 to the extent that it does not affect the projection of the image onto the projection target (e.g., the windshield 70) (step S5).

The repetition of the normal display mode and the partial reflection mode is performed in synchronization with the refresh rate of the liquid crystal display panel 30. More specifically, the update frequency of the projection image is assumed to be 30 fps. The switching between the normal display mode and the partial reflection mode is performed at 60 fps (refer to FIG. 16) or 30 fps (refer to FIG. 14).

If the all reflection mode is also set to be incorporated in the operation (Yes at step S6), that is, if the user sets the intervention of the all reflection mode, the partial reflection mode becomes the all reflection mode one out of two times (step S7). Specifically, one of the periods E2 and H2 that occur twice in the frame period 1F in FIG. 16 is in the state indicated in the "all reflection mode period" illustrated in FIG. 13, and the other is in the state indicated in the "partial reflection mode period" illustrated in FIG. 15. In other words, when the all reflection mode and the partial reflection mode are repeated, the projection image is maintained; but when the all reflection mode is incorporated, the projection image is not projected for a certain period of time. On the other hand, the entire high temperature section APA is subjected to the external light reflection and the turning-off of the backlight over the period, whereby the temperature of the entire high temperature area is more efficiently reduced.

If it is determined at step S2 that the partial temperature detection area PA is not present that has become the high temperature area APA having a temperature equal to or higher than the predetermined temperature (No at step S2), the processing from step S3 to step S7 is omitted. In other words, the normal display mode is maintained.

The blanking period of the liquid crystal display panel is provided at a latter stage of each frame period. In view of this, instead of setting the aforementioned modes in the order of the partial reflection mode, the normal display mode, the partial reflection mode, and the normal display mode in one frame period when the frame rate is 60 fps, the modes may preferably be set in the order of the normal display mode, the partial reflection mode, the normal display mode, and the partial reflection mode such that the blanking period falls in the period of the partial reflection mode. In other words, the periods E1 and E2 in FIG. 16 may be interchanged, and the periods H1 and H2 may be interchanged. Similarly, when the frame rate is 30 fps, the modes can be set in the order of the normal display mode and the partial reflection mode instead of being set in the order of the partial reflection mode and the normal display mode such that the blanking period falls in the period of the partial reflection mode. In other words, in FIG. 14, the period A2 may be set such that period A2 is included in the periods E2 and H2.

When the light control panel temperature detector 45 is provided, as illustrated in FIG. 5, control is applied that is based on the result of a comparison between the temperature of the partial temperature detection area PA in the light control panel temperature detector 45 and the temperature of the partial temperature detection area PA in the temperature detector 40. The following explains the control with reference to FIGS. 18 and 19.

FIG. 18 is a flowchart illustrating an exemplary control process based on the result of the comparison between the temperature of the partial temperature detection area PA in the light control panel temperature detector 45 and the temperature of the partial temperature detection area PA in the temperature detector 40. First, the temperature information on the liquid crystal display panel 30 and the light control panel 20 is collected (step S11). Specifically, the temperature information collector 1101 outputs the drive signal to the temperature detector 40 and collects the outputs from the output lines Vout, and outputs the drive signal to the light control panel temperature detector 45 and collects the outputs from the output lines Vout. The output of the drive signal to the temperature detector 40 and the acquisition of the outputs from the output lines Vout are the same as the processing at step S1 in FIG. 17. Through the output of the drive signal to the light control panel temperature detector 45 and the acquisition of the outputs from the output lines Vout, information can be obtained that indicates the temperature of each partial temperature detection area PA included in the light control panel temperature detector 45, that is, the temperature of each part of the light control panel 20 that overlaps with a corresponding one of the partial temperature detection areas PA.

After the processing at step S11, the mode selector 1102 determines whether at least one of the liquid crystal display panel 30 and the light control panel 20 has the partial temperature detection area PA that has become the high temperature area APA having a temperature equal to or higher than the predetermined temperature (equal to or higher than 60 degrees in this embodiment) (step S12). If it is determined that the partial temperature detection area PA is present that has become the high temperature area APA having a temperature equal to or higher than the predetermined temperature (Yes at step S12), the operation mode is selected based on the relation in temperature between the liquid crystal display panel 30 and the light control panel 20, and the temperature of the high temperature area APA (step S13). Then, the operations of the light control panel 20 and backlight 101 are controlled in accordance with the operation mode selected by the processing at step S13 (step S14).

If it is determined at step S12 that the partial temperature detection area PA is not present that has become the high temperature area APA having a temperature equal to or higher than the predetermined temperature (No at step S12), the processing at steps S13 and S14 is omitted. In this case, this display system is controlled in the normal display mode. In other words, the light control panel 20 is driven in the sleep mode and the backlight 101 is driven in the first light emission mode. The following explains the details of the processing at step S13 with reference to FIG. 19.

FIG. 19 is a flowchart illustrating an exemplary specific processing at step S13 illustrated in FIG. 18. The mode selector 1102 determines whether the temperature of the liquid crystal display panel 30 is higher than that of the light control panel 20 based on the temperature of the liquid crystal display panel 30 and the temperature of the light control panel 20 that are collected by the processing at step S11 (step S21). Specifically, the mode selector 1102 employs, as the temperature of the liquid crystal display panel 30, the highest temperature in the temperatures of the respective partial temperature detection areas PA included in the temperature detector 40. The mode selector 1102 employs, as the temperature of the light control panel 20, the highest temperature in the temperatures of the respective partial temperature detection areas PA included in the light control panel temperature detector 45. The mode selector 1102 compares the temperature of the liquid crystal display panel 30 with the temperature of the light control panel 20 to determine whether the temperature of the liquid crystal display panel 30 is higher than that of the light control panel 20. If it is determined that the temperature of the light control panel 20 is equal to or lower than that of the liquid crystal display panel 30 (No at step S21), the normal display mode is still maintained, the light control panel 20 does not reflect sunlight LL, and normal display (projection) is performed (step S22). In this case, in the processing at step S14, the light control panel 20 is controlled to bring the state of the liquid crystal LQ in all of the light control areas MPIX into the first state LQ1. The states of all the light sources included in the backlight 101 are caused to be the lighting-on light sources ALA, regardless of whether it is in the projection period or the blanking period.

If it is determined that the temperature of the liquid crystal display panel 30 is higher than that of the light control panel 20 by the processing at step S21 (Yes at step S22), the light control panel processor 1103 includes, in the local reflection area, the light control area MPIX overlapping with the high temperature area APA in front view (step S23). The light source processor 1104 includes, in the local lighting-off area, the light source that overlaps with the high temperature area APA in plan view (step S24). The processing at step S23 and the processing at step S24 are performed in random order.

The high temperature area APA in the processing at steps S23 and S24 refers to the high temperature area APA of the liquid crystal display panel 30. Specifically, even when both the liquid crystal display panel 30 and the light control panel 20 have the high temperature area APA, and the high temperature area APA of the liquid crystal display panel 30 and the high temperature area APA of the light control panel 20 do not overlap in front view, the high temperature area APA that "overlaps in front view" in the processing at steps S23 and S24 indicates the high temperature area APA of the liquid crystal display panel 30. If only the light control panel 20 has the high temperature area APA, the processing at step S23 and the processing at step S24 are not performed because the processing at step S21 is followed by the processing at step S22.

After the processing at steps S23 and the processing at S24, the mode selector 1102 determines whether the temperature of the high temperature area APA of the liquid crystal display panel 30 is equal to or higher than 100° C. (step S25). Specifically, the mode selector 1102 determines whether the output is obtained that indicates that the temperature is equal to or higher than 100° C. In other words, if at least one partial temperature detection area PA is present that indicates that the output is equal to or higher than 100° C., the mode selector 1102 determines that the high temperature area APA of the liquid crystal display panel 30 is equal to or higher than 100° C. If it is determined that the temperature of the high temperature area APA of the liquid crystal display panel 30 is equal to or higher than 100° C. (Yes at step S25), the mode selector performs control on the light control panel 20 and the backlight 101 such that the all reflection mode is applied (an operation mode C) (step S26). For example, when the light control panel 20 and the backlight 101 operate at 30 fps, which is the same period as the frame rate of the liquid crystal display panel 30 (refer to FIG. 14), the all reflection mode is performed during the first quarter of the frame period, and the normal display mode is performed during the remaining three quarters of the frame period. Alternatively, the normal display mode is performed during the first three quarters of the frame period, and the all reflection mode is inserted and performed during the remaining quarter of the frame period. When the light control panel 20 and the backlight 101 operate at a frame rate of 60 fps, which is twice the frame rate of the liquid crystal display panel 30 (refer to FIG. 16), the normal display mode and the all reflection mode are performed during the first quarter and the third quarter of the frame period while the normal display mode is performed during the second quarter and the fourth quarter of the frame period. The order of the normal display mode and the all reflection mode can be interchanged.

By controlling the light control panel 20 and the backlight 101 in this way, a situation occurs where no display (projection) is made for a certain period of time. However, the certain period of time is a momentary period, and therefore human eyes hardly recognize such no display situation. In the certain period of time, the external light reflection by the light control panel and the lighting-off of the backlight are performed on the entire high temperature area, thereby promoting the reduction of the temperature of the high temperature area.

If it is determined that the temperature of the high temperature area APA of the liquid crystal display panel 30 is lower than 100° C. by the processing at step S25 (No at step S25), the mode selector 1102 determines whether the temperature of the high temperature area APA of the liquid crystal display panel 30 is equal to or higher than 80° C. (step S27). Specifically, the mode selector 1102 determines whether the output is obtained that indicates that the temperature is equal to or higher than 80° C. If it is determined that the temperature of the high temperature area APA of the liquid crystal display panel 30 is equal to or higher than 80° C. (Yes at step S27), the mode selector performs control on the light control panel 20 and the backlight 101 such that the all reflection mode and the partial reflection mode are applied (an operation mode B) (step S28). For example, when the light control panel 20 and the backlight 101 operate at 30 fps, which is the same period as the frame rate of the liquid crystal display panel 30 (refer to FIG. 14), the all reflection mode is performed during the first quarter of the frame period, and the normal display mode is performed during the remaining three quarters of the frame period. Then, during the first quarter of the next frame period, the partial reflection mode is performed, and in the remaining three quarters of the frame period, the normal display mode is performed. When the light control panel 20 and the backlight 101 operate at a frame rate of 60 fps, which is twice the frame rate of the liquid crystal display panel 30 (refer to FIG. 16), the all reflection mode is performed during the first quarter of the frame period, the partial reflection mode is performed during the third quarter of the frame period, and the normal display mode is performed during the second quarter and the fourth quarter of the frame period. The order of the normal display mode and the all reflection mode can be interchanged.

By controlling the light control panel 20 and the backlight 101 in this way, a situation occurs where no display (projection) is made for a certain period of time, which is shorter than that at step S26. However, the certain period of time is a momentary period, and therefore human eyes hardly recognize such no display situation. In the certain period of time, the external light reflection by the light control panel 20 and the lighting-off of the backlight 101 are performed on the entire high temperature area, thereby promoting the reduction of the temperature of the high temperature area, although the efficiency is lower than that at step S26.

If it is determined that the temperature of the high temperature area APA of the liquid crystal display panel 30 is lower than 80° C. by the processing at step S27 (No at step S27), the mode selector 1102 performs control on the light control panel 20 and the backlight 101 such that the normal display mode is incorporated in the partial reflection mode (the operation mode A) (step S29). For example, when the light control panel 20 and the backlight 101 operate at 30 fps, which is the same period as the frame rate of the liquid crystal display panel 30 (refer to FIG. 14), the partial reflection mode is performed during the first quarter of the frame period, and the normal display mode is performed during the remaining three quarters of the frame period. When the light control panel 20 and the backlight 101 operate at a frame rate of 60 fps, which is twice the frame rate of the liquid crystal display panel 30 (refer to FIG. 16), the partial reflection mode is performed during the first quarter and the third quarter of the frame period, and the normal display mode is performed during the second quarter and the fourth quarter of the frame period. The order of the normal display mode and the all reflection mode can be interchanged.

The light control panel 20 and the backlight 101 are controlled in this way. As a result, the external light reflection by the light control panel and the lighting-off of the backlight are performed on a part of the high temperature area without affecting the display (projection), thereby promoting the reduction of the temperature of the high temperature area, although the efficiency is lower than those at step S26 and step S28.

The predetermined temperature is 60° C., for example, but is not limited to this, and is preferably set within a range that allows the liquid crystal display panel 30 and the light control panel 20 to maintain good operation.

As explained above, the display system 1 according to the embodiment includes: the transmissive liquid crystal display panel 30; the light control panel 20 having the active area RA provided with the light control areas MPIX that are switchable between a light reflection state and a light transmission state; the temperature detector 40 having the temperature detection area SA provided with the temperature detection resistor ER; the backlight 101 that emits projection light onto the liquid crystal display panel 30; and the controller 110 that controls the operation of the light control panel 20 based on the output of the temperature detector 40 corresponding to the temperature of the temperature detection resistor ER. The temperature detector 40 is provided in the liquid crystal display panel 30. The display area AA of the liquid crystal display panel 30, the active area RA of the light control panel 20, and the temperature detection area SA of the temperature detector 40 overlap with one another on the optical path of the projection light L. The projection light L after passing through the display area AA and the active area RA is projected onto the projection target having a light-transmitting property (e.g., the windshield 70) to cause the user to view the virtual image VG. The controller 110 causes the light control area MPIX to reflect light when the output is obtained that indicates that the temperature of the temperature detection resistor ER is equal to or higher than the predetermined temperature. The light control panel 20 is disposed at such an angle that, when the light control area MPIX is in the light reflection state, the light control panel 20 reflects external light (e.g., the sunlight LL) entering from the projection target side and reaching the light control area MPIX to the position that is out of the optical path of the projection light L and different from the position of the liquid crystal display panel 30 (e.g., to the heat absorber 103).

With this configuration, the light control area MPIX controlled to reflect light can reflect external light (e.g., the sunlight LL) incident on the liquid crystal display panel 30 from the outside. As a result, even when the temperature of the liquid crystal display panel 30 rises to a temperature equal to or higher than the predetermined temperature due to the entrance of external light (e.g., sunlight LL), a further temperature rise after achievement of the predetermined temperature can be restrained.

The display system 1 includes the multiple light control areas MPIX and the multiple temperature detection resistors ER. One or more of the light control areas MPIX are provided in each of regions that respectively overlap with the temperature detection resistors ER. The controller 110 causes the light control areas MPIX overlapping with, among the temperature detection resistors ER, the temperature detection resistor ER that has a temperature equal to or higher than the predetermined temperature to reflect light. With this configuration, when the temperature of the liquid crystal display panel 30 rises due to the entrance of external light (e.g., sunlight LL) and becomes a temperature equal to or higher than the predetermined temperature, it is possible to reflect light in a region corresponding to the partial area corresponding to a spot where the temperature becomes equal to or higher than the predetermined temperature (e.g., the hot spot HS) and not to reflect light out of the region.

The first temperature (e.g., 60° C.) and the second temperature (e.g., 80° C.) that is higher than the first temperature are each set as the predetermined temperature. The controller 110 applies the first mode when the output is obtained that indicates that the temperature of the temperature detection resistor ER in the temperature detector 40 is equal to or higher than the first temperature and lower than the second temperature. The controller 110 applies the first mode and the second mode by periodically switching between the first and the second modes when the output is obtained that indicates that the temperature of the temperature detection resistor ER in the temperature detector 40 is equal to or higher than the second temperature. The first mode is the operation mode to cause the light control area MPIX to reflect light, the light control area MPIX being located at the position that does not block light passing through the pixel controlled such that the pixel transmits the projection light L in the liquid crystal display panel 30, among the light control areas MPIX overlapping with the temperature detection resistor ER having the temperature equal to or higher than the first temperature among the temperature detection resistors ER. The second mode is the operation mode to cause the light control areas MPIX to reflect light, the light control areas MPIX overlapping with the temperature detection resistor ER having the temperature equal to or higher than the second temperature among the temperature detection resistors ER. This more reliably restrains the external light (e.g., the sunlight LL) from being incident on the liquid crystal display panel 30 having a temperature equal to higher than the second temperature. As a result, a further temperature rise after achievement of the temperature equal to higher than the second temperature can be more reliably restrained.

The third temperature (e.g., 100° C.) that is higher than the second temperature (e.g., 80° C.) is further set as the predetermined temperature. The controller 110 applies the first mode and the second mode by periodically switching between the first mode and the second mode when the output is obtained that indicates that the temperature of the temperature detection resistor ER included in the temperature detector 40 is equal to or higher than the second temperature and lower than the third temperature. The controller 110 applies the second mode when the output is obtained that indicates that the temperature of the temperature detection resistor ER included in the temperature detector 40 is equal to or higher than the third temperature. This allows the time allocated for reflection of external light (e.g., the sunlight LL) to be switched depending on whether the temperature is in a range equal to or higher than the second temperature and lower than third temperature or in a range equal to or higher than the third temperature, even though the projection time is shortened, thereby allowing better achievement of maintaining projection of the virtual image and restraining the temperature rise.

The backlight 101 has the multiple light sources. One or more of the light sources are provided in each of regions that respectively overlap with the temperature detection resistors ER. The controller 110 turns on, among the light sources, the light source overlapping with the pixel controlled such that the pixel transmits the projection light L in the liquid crystal display panel 30 and turns off the light source not overlapping with the pixel controlled such that the pixel transmits the projection light L in the liquid crystal display panel 30 during the period in which the first mode is applied as the operation mode of the light control area MPIX. The controller 110 turns off all of the light sources during the period in which the second mode is applied as the operation mode of the light control area MPIX. The controller 110 turns on all of the light sources during the other period. This restrains further temperature increase due to the heat generated by the light source overlapping with the temperature detection resistor ER having a temperature equal to or higher than the predetermined temperature. In addition, power consumption can be further reduced by restraining unnecessary lighting of light sources in areas where the virtual image VG is not projected.

The display system 1 further includes the light control panel temperature detector 45 that detects the temperature of the light control panel 20. The controller 110 causes the light control area MPIX to reflect light when the temperature of the liquid crystal display panel 30 is higher than that of the light control panel 20. The controller 110 causes the light control area MPIX not to reflect light when the temperature of the liquid crystal display panel 30 is equal to or lower than that of the light control panel 20. This restrains the temperature of the light control panel 20, which reflects light in the light control areas MPIX, from rising too high due to external light.

In the explanation with reference to FIGS. 8 to 10, the light sources provided in the backlight 101 are arranged one in each of the partial temperature detection areas PA. This is only an example of the light source arrangement, and the arrangement and the number of light sources are not limited to this example. More than one light source may be disposed for each of the regions that respectively overlap with the partial temperature detection areas PA. In that case, in the backlight 101, the more than one light source overlapping with one partial temperature detection area PA is considered as a set of light sources. Each set of light sources is provided such that lighting-on and lighting-off are switchable on a light source set-by-light source set basis.

In the explanation above, the first temperature is 60° C., the second temperature is 80° C., and the third temperature is 100° C. These temperatures are only examples and are not limited to these temperatures. The first, the second, and the third temperatures are set individually to appropriate temperatures depending on the characteristics of each structure included in the display system 1, such as temperature resistance properties of the liquid crystal display panel 30 and the light control panel 20.

Other action effects provided by the modes described in the above-mentioned embodiment that are obvious from description of the present specification or at which those skilled in the art can appropriately arrive should naturally be interpreted to be provided by the present disclosure.

What is claimed is:

1. A display system comprising:
a transmissive liquid crystal display panel;
a light control panel having an active area provided with a light control area that is switchable between a light reflection state and a light transmission state;
a temperature detector having a temperature detection area provided with a temperature detection resistive element;
a backlight that is configured to emit projection light onto the liquid crystal display panel; and
a controller that is configured to control an operation of the light control panel based on an output of the temperature detector corresponding to a temperature of the temperature detection resistive element, wherein
the temperature detector is provided in the liquid crystal display panel,
a display area of the liquid crystal display panel, the active area, and the temperature detection area overlap with one another on an optical path of the projection light,
the projection light after passing through the display area and the active area is projected onto a projection target having a light-transmitting property,
the light control panel is disposed at such an angle that, when the light control area is in the light reflection state, the light control panel reflects external light entering from the projection target side and reaching the light control area to a position that is out of the optical path of the projection light and different from a position of the liquid crystal display panel, and
the controller causes the light control area to reflect light when the output is obtained that indicates that the temperature of the temperature detection resistive element is equal to or higher than a predetermined temperature.

2. The display system according to claim 1, wherein
the display system includes a plurality of the light control areas and a plurality of the temperature detection resistive elements,
one or more of the light control areas are provided in each of regions that respectively overlap with the temperature detection resistive elements, and
the controller causes the one or more of light control areas overlapping with the temperature detection resistive element that has a temperature equal to or higher than the predetermined temperature to reflect light.

3. The display system according to claim 2, wherein
a first temperature and a second temperature higher than the first temperature are each set as the predetermined temperature,
the controller is configured to apply a first mode when the output is obtained that indicates that the temperature of the temperature detection resistive element is equal to or higher than the first temperature and lower than the second temperature,
the controller is configured to apply the first mode and a second mode by periodically switching between the first and the second modes when the output is obtained that indicates that the temperature of the temperature detection resistive element is equal to or higher than the second temperature, the first mode is an operation mode to cause the light control area to reflect light, the light control area being located at a position that does not block light passing through a pixel controlled such that the pixel transmits the projection light in the liquid crystal display panel, among the light control areas overlapping with the temperature detection resistive element having the temperature equal to or higher than the first temperature among the temperature detection resistive elements, and
the second mode is an operation mode to cause the light control areas to reflect light, the light control areas overlapping with the temperature detection resistive element having the temperature equal to or higher than the second temperature among the temperature detection resistive elements.

4. The display system according to claim 3, wherein
a third temperature higher than the second temperature is set as the predetermined temperature,
the controller is configured to apply the first mode and the second mode by periodically switching between the first mode and the second mode when the output is obtained that indicates that the temperature of the temperature detection resistive element is equal to or higher than the second temperature and lower than the third temperature, and
the controller is configured to apply the second mode when the output is obtained that indicates that the temperature of the temperature detection resistive element is equal to or higher than the third temperature.

5. The display system according to claim 3, wherein
the backlight has a plurality of light sources,
one or more of the light sources are provided in each of regions that respectively overlap with the temperature detection resistive elements,
the controller is configured to turn on, in the light sources, the light source overlapping with the pixel controlled such that the pixel transmits the projection light in the liquid crystal display panel, and turns off the light source not overlapping with the pixel controlled such that the pixel transmits the projection light in the liquid crystal display panel during a period in which the first mode is applied as the operation mode of the light control area,
the controller is configured to turn off all of the light sources during a period in which the second mode is applied as the operation mode of the light control area, and
the controller is configured to turn on all of the light sources during the other period.

6. The display system of claim 1, further comprising a light control panel temperature detector configured to detect a temperature of the light control panel, wherein
the controller is configured to cause the light control area to reflect light when the temperature of the liquid crystal display panel is higher than the temperature of the light control panel, and
the controller is configured to cause the light control area not to reflect light when the temperature of the liquid crystal display panel is equal to or lower than the temperature of the light control panel.

* * * * *